US012224812B2

(12) United States Patent
Yang et al.

(10) Patent No.: US 12,224,812 B2
(45) Date of Patent: Feb. 11, 2025

(54) METHOD FOR CHANNEL AND INTERFERENCE MEASUREMENT AND DEVICE

(71) Applicant: VIVO MOBILE COMMUNICATION CO., LTD., Chang'an Dongguan (CN)

(72) Inventors: Yu Yang, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 162 days.

(21) Appl. No.: 17/372,137

(22) Filed: Jul. 9, 2021

(65) Prior Publication Data

US 2021/0336712 A1 Oct. 28, 2021

Related U.S. Application Data

(63) Continuation of application No. PCT/CN2020/070874, filed on Jan. 8, 2020.

(30) Foreign Application Priority Data

Jan. 11, 2019 (CN) .......................... 201910028471.6

(51) Int. Cl.
*H04B 17/345* (2015.01)
*H04B 7/0452* (2017.01)
(52) U.S. Cl.
CPC ......... *H04B 17/345* (2015.01); *H04B 7/0452* (2013.01)
(58) Field of Classification Search
None
See application file for complete search history.

(56) References Cited

U.S. PATENT DOCUMENTS

| 9,999,074 | B2 * | 6/2018 | Moon | ...................... H04B 7/06 |
| 2013/0196675 | A1 | 8/2013 | Xiao | |
| 2016/0149688 | A1 | 5/2016 | Song | |
| 2017/0207891 | A1 * | 7/2017 | Yi | ......................... H04L 5/0048 |
| 2019/0165847 | A1 * | 5/2019 | Kim | ...................... H04W 24/10 |
| 2019/0296875 | A1 | 9/2019 | Qin | |

(Continued)

FOREIGN PATENT DOCUMENTS

| CN | 103945447 A | 7/2014 |
| CN | 107733611 A | 2/2018 |

(Continued)

OTHER PUBLICATIONS

R1-1720291 WG1 Meeting #91, "Beam failure recovery," Discussion notes, Nov. 27-Dec. 11, 2017.

(Continued)

*Primary Examiner* — Jeffrey M Rutkowski
*Assistant Examiner* — Luna Weissberger
(74) *Attorney, Agent, or Firm* — von Briesen & Roper, s.c.

(57) ABSTRACT

This disclosure provides a method for channel and interference measurement and a device. The method includes: receiving a first group of reference signal resources; and measuring a channel and an interference that are corresponding to at least one first reference signal resource in the first group of reference signal resources, where the channel and the interference that are corresponding to the first reference signal resource are measured based on quasi co-location QCL information of the first reference signal resource.

20 Claims, 6 Drawing Sheets

(56) References Cited

U.S. PATENT DOCUMENTS

| | | | |
|---|---|---|---|
| 2019/0356364 A1* | 11/2019 | Maamari | H04L 5/0062 |
| 2020/0119821 A1 | 4/2020 | Qin | |
| 2020/0245166 A1* | 7/2020 | Kwak | H04B 7/024 |
| 2021/0105115 A1 | 4/2021 | Qin et al. | |
| 2021/0337415 A1* | 10/2021 | Chen | H04L 5/005 |

FOREIGN PATENT DOCUMENTS

| | | | |
|---|---|---|---|
| CN | 108282296 A | 7/2018 | |
| CN | 108540178 A | 9/2018 | |
| CN | 109150338 A | 1/2019 | |
| CN | 110602743 A | 12/2019 | |
| WO | 2018141425 A1 | 8/2018 | |

OTHER PUBLICATIONS

R2-1800439, Ad hoc 0118 Discussion notes, "Configuration structure of the reportTrigger in CSI-MeasConfig (RILNoZ019)," Jan. 22-26, 2018.

Office Action from Chinese Patent Office dated Sep. 28, 2020, in related application 201910028471.6.

Written Opinion and International Preliminary Report on Patentability dated Jul. 22, 2021, in related application PCT1901059CN, dated Jun. 16, 2021.

Extended European Search Report for related Application No. 20738504.8; reported on Jan. 20, 2022.

Sinapore first Office Action related to Application No. 112021075855; reported in Jun. 27, 2023.

Korean Office Action related to Application No. 10-2021-7023727 received on: Apr. 25, 2024.

R1-1801579—3GPP TSG RAN WG1 Meeting #92, Athens, Greece, February 26,-Mar. 2, 2018—Source: ZTE, Sanechips, Title: Remaining details on CSI measurement, Agenda Item: 7.1.2.2.1, Document for: Discussion and Decision.

R1-1802076—3GPP TSG RAN WG1 Meeting #92, Athens, Greece, February 26,-Mar. 2, 2018—Agenda Item: 7.1.2.4, Source: Huawei, HISilicon, Title: Discussion on CSI configuration framework, Document for: Discussion and Decision.

Korean Office Action related to Application No. 10-2021-7023727; reported on Dec. 12, 2024.

R1-1800857—3GPP TSG RAN WG1 Meeting AH 1801, Vancouver, Canada, Jan. 22-26, 2018—Source: Qualcomm Incorporated, Title: Remaining Details on CSI Measurement, Document for: Discussion/Decision.

* cited by examiner

METHOD FOR CHANNEL AND INTERFERENCE MEASUREMENT AND DEVICE

CROSS-REFERENCE TO RELATED APPLICATIONS

This application is a continuation application of a PCT Application No. PCT/CN2020/070874 filed on Jan. 8, 2020, which claims priority to Chinese Patent Application No. 201910028471.6, filed in China on Jan. 11, 2019, which is incorporated herein by reference in its entirety.

TECHNICAL FIELD

This disclosure relates to the field of communications technologies, and more specifically, to a method for channel and interference measurement and a device.

BACKGROUND

To support access of a larger number of users, a massive multiple-input multiple-output MIMO) technology using a larger number of antenna ports, such as the massive MIMO technology using a large quantity of antenna arrays, has been introduced into mobile communications systems. Beamforming is one of the key technologies for implementing multi-user MIMO (MU-MIMO) in massive MIMO. With beamforming, a directional beam can be produced by adjusting a weighting coefficient of each array element in the antenna array. Different beams obtained through beamforming have different quality. Therefore, parameter measurement needs to be performed to select an appropriate beam based on measurement results, for signal or channel transmission.

During beam measurement, a network device configures, for a terminal device (User Equipment, UE), a reference signal resource set RS resource set) used for beam measurement, and the UE measures a layer 1 (L1) reference signal received power (RSRP) corresponding to each beam link, and reports related information of a plurality of beams with best measurement results to the network device based on the L1-RSRPs, so that the network device selects a beam used for transmitting a signal or channel to the UE. However, the beam selected by the network device based on the L1-RSRP is not ideal, leading to defects of a low throughput or a high block error rate during signal or channel transmission.

SUMMARY

Some embodiments of this disclosure provide a method for channel and interference measurement and a device, so that a network device selects an ideal beam for transmitting a signal or channel to UE, thereby improving a throughput and decreasing a block error rate.

According to a first aspect, a method for channel and interference measurement is provided, applied to a terminal device, where the method includes:
 receiving a first group of reference signal resources; and
 measuring a channel and an interference that are corresponding to at least one first reference signal resource in the first group of reference signal resources; where
 the channel and the interference that are corresponding to the first reference signal resource are measured based on quasi co-location QCL information of the first reference signal resource.

According to a second aspect, a method for channel and interference measurement is provided, applied to a network device, where the method includes:
 transmitting a first group of reference signal resources to a terminal device, where
 the terminal device is configured to measure a channel and an interference that are corresponding to at least one first reference signal resource in the first group of reference signal resources, and measure, based on quasi co-location QCL information of the first reference signal resource, the channel and the interference that are corresponding to the first reference signal resource.

According to a third aspect, a terminal device is provided, where the terminal device includes:
 a first receiving module, configured to receive a first group of reference signal resources; and
 a measurement module, configured to measure a channel and an interference that are corresponding to at least one first reference signal resource in the first group of reference signal resources; where
 the measurement module is configured to measure, based on quasi co-location QCL information of the first reference signal resource, the channel and the interference that are corresponding to the first reference signal resource.

According to a fourth aspect, a network device is provided, where the network device includes:
 a first transmitting module, configured to transmit a first group of reference signal resources to a terminal device; where
 the terminal device is configured to measure a channel and an interference that are corresponding to at least one first reference signal resource in the first group of reference signal resources, and measure, based on quasi co-location QCL information of the first reference signal resource, the channel and the interference that are corresponding to the first reference signal resource.

According to a fifth aspect, a terminal device is provided, where the terminal device includes a memory, a processor, and a wireless communications program stored in the memory and capable of running on the processor, and when the wireless communications program is executed by the processor, the steps of the method according to the first aspect are implemented.

According to a sixth aspect, a network device is provided, where the network device includes a memory, a processor, and a wireless communications program stored in the memory and capable of running on the processor, and when the wireless communications program is executed by the processor, the steps of the method according to the second aspect are implemented.

According to a seventh aspect, a computer-readable medium is provided, where a wireless communications program is stored in the computer-readable medium, and when the wireless communications program is executed by a processor, the steps of the method according to the first aspect or the second aspect are implemented.

In some embodiments of this disclosure, the QCL information of the first reference signal resource in the first group of reference signal resources can be used to measure the channel corresponding to the first reference signal resource, and the QCL information of the first reference signal resource can also be used to measure the interference corresponding to the first reference signal resource. In this way, a measurement result better reflecting signal quality of a beam corresponding to the first reference signal resource can be obtained, so that the network device selects an ideal beam for transmitting a signal or channel to UE, thereby improving a throughput and decreasing a block error rate.

BRIEF DESCRIPTION OF DRAWINGS

To describe the technical solutions in the embodiments of this disclosure or in the prior art more clearly, the following briefly describes the accompanying drawings required for describing the embodiments or the prior art. Apparently, the accompanying drawings in the following description show merely some embodiments recorded in this disclosure, and a person of ordinary skill in the art may still derive other drawings from these accompanying drawings without creative efforts.

DESCRIPTION OF EMBODIMENTS

To make a person skilled in the art understand the technical solutions in this disclosure better, the following clearly describes the technical solutions in some embodiments of this disclosure with reference to the accompanying drawings in some embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure.

It should be understood that the technical solutions in some embodiments of this disclosure can be applied to various communications systems, such as a global system for mobile communications (GSM), a code division multiple access (CDMA) system, wideband code division multiple access (WCDMA), general packet radio service (GPRS), a long term evolution (LTE) system, an LTE frequency division duplex (FDD) system, an LTE time division duplex (TDD), a universal mobile telecommunications system (UMTS) or a worldwide interoperability for microwave access (WiMAX) communications system, a 5G system, or a new radio (NR) system.

A terminal device (User Equipment, UE) is also referred to as a mobile terminal, a mobile terminal device, and the like, and may communicate with at least one core network through a radio access network (for example, RAN). The terminal device may be a mobile terminal, such as a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

A network device is an apparatus deployed in a radio access network and used for providing a parameter measurement function. The network device may be a base station, and the base station may be a base station (BTS) in GSM or CDMA, may be a NodeB in WCDMA, or may be an evolved NodeB (eNB or e-NodeB) in LTE, a 5G NodeB (gNB), or a network-side device in a subsequent evolved communications system. However, the terms used do not constitute any limitation on the protection scope of this disclosure.

It should be noted that, during description of specific embodiments, sequence numbers of processes do not mean execution order and should not be construed as any limitation on the implementation processes in some embodiments of this disclosure, and the execution order of the processes should be determined based on functions and internal logic of the processes.

The following describes a method for channel and interference measurement applied to a terminal device with reference to FIG. 1 to FIG. 5.

Figure 1:
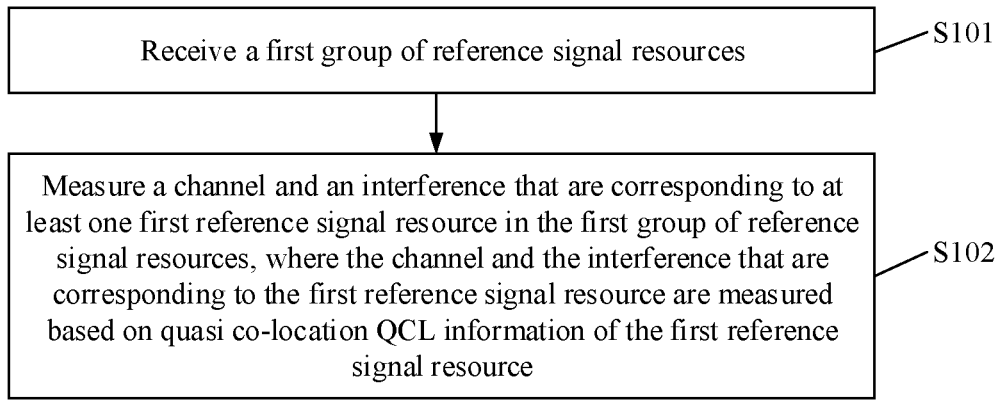
FIG. 1 is a schematic flowchart 1 of a method for channel and interference measurement according to some embodiments of this disclosure.

FIG. 1 shows a method for channel and interference measurement applied to a terminal device according to an embodiment of this disclosure. As shown in FIG. 1, the method may include the following steps.

Step 101: Receive a first group of reference signal resources.

The first group of reference signal resources may be reference signal resources (RS resource) transmitted by a network device and used for measuring signal quality parameters of a plurality of transmit beams of the network device. Generally, one transmit beam corresponds to one signal quality parameter. The signal quality parameter may be a signal to interference plus noise ratio (SINR). However, it should be noted that the SINR in some embodiments of this disclosure is different from a SINR in the related art.

During specific measurement, one transmit beam of the network device may correspondingly transmit one or more reference signal resources, and reference signal resources transmitted by a plurality of transmit beams form the first group of reference signal resources. For example, it is assumed that the network device has four transmit beams: a transmit beam 1, a transmit beam 2, a transmit beam 3, and a transmit beam 4. If during one measurement period, the transmit beam 1 transmits a reference signal resource 1, the transmit beam 2 transmits a reference signal resource 2, the transmit beam 3 transmits a reference signal resource 3, and the transmit beam 4 transmits a reference signal resource 4, a corresponding first group of reference signal resources includes the reference signal resource 1, the reference signal resource 2, the reference signal resource 3, and the reference signal resource 4. If during one measurement period, the transmit beam 1 transmits the reference signal resource 1 and the reference signal resource 2, the transmit beam 2 transmits the reference signal resource 3 and the reference signal resource 4, the transmit beam 3 transmits a reference signal resource 5, and the transmit beam 4 transmits a reference signal resource 6, a corresponding first group of reference signal resources includes the reference signal resource 1, the reference signal resource 2, the reference signal resource 3, the reference signal resource 4, the reference signal resource 5, and the reference signal resource 6.

Before receiving the first group of reference signal resources, the terminal device first receives configuration information of the group of reference signal resources. The configuration information is used for configuring one group of reference signal resources that includes the first group of reference signal resources. To be specific, in step 101, the received first group of reference signal resources may be part or all of the one group of reference signal resources pre-configured by the network, and the one group of reference signal resources pre-configured by the network device may include one or several reference signal resource sets (RS resource set). In addition, the configuration information may further include information such as quasi co-location (QCL) information of the reference signal resources in the first group of reference signal resources and a value of a repetition parameter (repetition) of each RS resource set.

The QCL information of the reference signal resources may include, but is not limited to, information such as a source reference signal resource (source RS) and a type of a QCL relationship, and the QCL relationship may include the following types:

QCL type A: {Doppler shift, Doppler spread, average delay, delay spread};
QCL type B: {Doppler shift, Doppler spread};
QCL type C: {Average delay, Doppler shift}; and
QCL type D: {Spatial receive (Receive, Rx) parameter}.

Repetition is a parameter used for determining whether to perform repeated measurement on a transmit beam of the network device. If the value of repetition is on, it indicates that repeated measurement is performed on one transmit beam of the network device; if the value of repetition is off, it indicates that a plurality of transmit beams of the network device are measured in a polling manner.

The first group of reference signal resources may include two or more reference signal resources, and the reference signal resources included in the first group of reference signal resources may include, but are not limited to, synchronization signal blocks (SSB) or channel state information-reference signals (CSI-RS).

Optionally, the reference signal resources included in the first group of reference signal resources may be CSI-RSs, because usually fine measurement is performed on a to-be-measured beam in a CSI-RS-based channel measurement manner, and a channel obtained through measurement may be more accurate than that obtained in SSB-based channel measurement, good for multi-beam and multi-user scheduling on a network side.

Step 102: Measure a channel and an interference that are corresponding to at least one first reference signal resource in the first group of reference signal resources.

The channel and the interference that are corresponding to the first reference signal resource are measured based on quasi co-location QCL information of the first reference signal resource.

The terminal device may specifically determine, based on the QCL information of the first reference signal resource, a reception parameter used for receiving the first reference signal resource; receive the first reference signal resource based on the reception parameter; and determine, based on a received power of the first reference signal resource, the channel corresponding to the first reference signal resource. In a more detailed example, a layer 1 (L1) reference signal resource received power (hereinafter referred to as RSRP) of the first reference signal resource may be determined as the channel corresponding to the first reference signal resource.

The interference corresponding to the first reference signal resource may include at least one of a first interference and a second interference that are described below. The following describes specific processes of measuring the first interference and the second interference by using specific examples.

In the first example, if the interference includes the first interference, the terminal device may measure, based on the QCL information of the first reference signal resource and at least one second reference signal resource, a first interference corresponding to the first reference signal resource. The first reference signal resource corresponds to a target signal quality parameter, and the second reference signal resource is a reference signal resource other than the first reference signal resource in the first group of reference signal resources.

In the first group of reference signal resources, after the first reference signal resource is determined, which reference signal resources to be used as the second reference signal resource depends on whether the reference signal resources correspond to the target signal quality parameter. In addition, generally, one transmit beam corresponds to one signal quality parameter. Therefore, it ultimately depends on whether a transmit beam corresponding to the reference signal resources is the same as a transmit beam corresponding to the first reference signal resource. If the transmit beam corresponding to the reference signal resources is the same as the transmit beam corresponding to the first reference signal resource, the reference signal resource cannot be used as the second reference signal resource; otherwise, the reference signal resource may be used as the second reference signal resource. That is, whether a reference signal resource in the first group of reference signal resources is used for measuring the channel or measuring the first interference depends on whether a transmit beam corresponding to the reference signal resource is a currently measured transmit beam. If yes, the reference signal resource is used for measuring the channel; otherwise, the reference signal resource is used for measuring the first interference. In other words, a reference signal resource used for measuring the channel is usually not used to measure the first interference.

On this basis, because the first interference corresponding to the first reference signal resource is determined based on at least one of other reference signal resources than the first reference signal resource in the first group of reference signal resources, and the other reference signal resources are reference signal resources transmitted by the network device and used for measuring other transmit beams of the network device, the first interference corresponding to the first reference signal resource may be considered as an interference representing an inter-beam interference.

In addition, the terminal device may determine, based on the QCL information, a reception parameter for receiving the at least one second reference signal resource; receive the at least one second reference signal resource based on the reception parameter; and determine, based on a received power of the at least one second reference signal resource, the first interference corresponding to the first reference signal resource.

Figure 2:
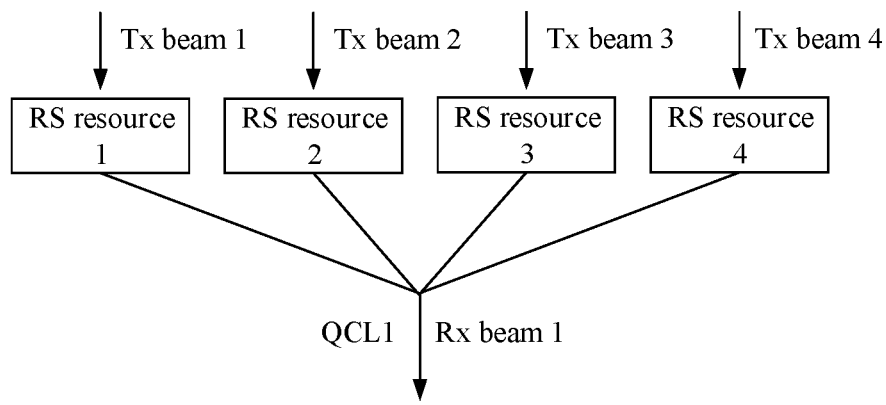
FIG. 2 is a schematic principle diagram 1 of a method for channel and interference measurement according to some embodiments of this disclosure.
Figure 3:
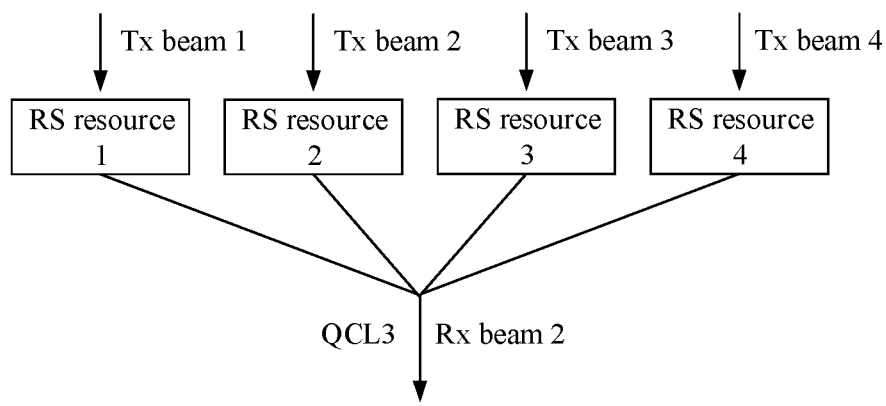
FIG. 3 is a schematic principle diagram 2 of a method for channel and interference measurement according to some embodiments of this disclosure.

The following describes, by using a more detailed example with reference to FIG. 2 and FIG. 3, a process of measuring the channel and the interference that are corresponding to the at least one first reference signal resource in the first group of reference signal resources.

It is assumed that the network device transmits the first group of reference signal resources to the terminal device by using four transmit beams (Tx beam). The four transmit beams are a transmit beam 1, a transmit beam 2, a transmit beam 3, and a transmit beam 4. The terminal device receives the first group of reference signal resources by using two receive beams (Rx beam), and the first group of reference signal resources includes a CSI-RS resource 1, a CSI-RS resource 2, a CSI-RS resource 3, and a CSI-RS resource 4. The terminal device successively measures the received CSI-RS resource 1, CSI-RS resource 2, CSI-RS resource 3, and CSI-RS resource 4 in a polling manner.

As shown in FIG. 2, during measurement on a channel and an interference of the CSI-RS resource 1, the terminal device determines, based on QCL information of the CSI-RS resource 1, that a beam for receiving the CSI-RS resource 1 is a receive beam 1. Then, the terminal device successively receives the CSI-RS resource 1, the CSI-RS resource 2, the CSI-RS resource 3, and the CSI-RS resource 4 by using the receive beam 1; determines that received powers of the CSI-RS resource 1, the CSI-RS resource 2, the CSI-RS resource 3, and the CSI-RS resource 4 are RSRP11, RSRP12, RSRP13, and RSRP14, respectively, that is, obtaining quality of links between the four transmit beams and the receive beam 1; and uses RSRP11 as the channel corresponding to the CSI-RS resource 1, and RSRP12, RSRP13, and RSRP14 as a first interference corresponding to the CSI-RS resource 1. Optionally, a signal to interference plus noise ratio corresponding to the CSI-RS resource 1 may be further obtained through calculation as follows:

$$SINR1=RSRP11/(RSRP12+RSRP13+RSRP14)$$

Further, as shown in FIG. 2, during measurement on a channel and an interference of the CSI-RS resource 2, the terminal device determines, based on QCL information of the CSI-RS resource 2, that a beam for receiving the CSI-RS resource 2 is also the receive beam 1. Then, the terminal device obtains, through measurement by using the receive beam 1, received powers of the CSI-RS resource 1, the CSI-RS resource 2, the CSI-RS resource 3, and the CSI-RS resource 4, namely RSRP11, RSRP12, RSRP13, and RSRP14, respectively; and uses RSRP12 as the channel corresponding to the CSI-RS resource 2, and RSRP11, RSRP13, and RSRP14 as a first interference corresponding to the CSI-RS resource 2. Optionally, a signal to interference plus noise ratio corresponding to the CSI-RS resource 2 may be further obtained through calculation as follows:

$$SINR2=RSRP12/(RSRP11+RSRP13+RSRP14)$$

As shown in FIG. 3, during measurement on a channel and an interference of the CSI-RS resource 3, the terminal device determines, based on QCL information of the CSI-RS resource 3, that a beam for receiving the CSI-RS resource 3 is a receive beam 2. Then, the terminal device obtains, through measurement by using the receive beam 2, received powers of the CSI-RS resource 1, the CSI-RS resource 2, the CSI-RS resource 3, and the CSI-RS resource 4, namely RSRP21, RSRP22, RSRP23, and RSRP24, respectively; and uses RSRP23 as the channel corresponding to the CSI-RS resource 3, and RSRP21, RSRP22, and RSRP24 as a first interference corresponding to the CSI-RS resource 3. Optionally, a signal to interference plus noise ratio corresponding to the CSI-RS resource 3 may be further obtained through calculation as follows:

$$SINR3=RSRP23/(RSRP21+RSRP22+RSRP24)$$

Further, as shown in FIG. 3, during measurement on a channel and an interference of the CSI-RS resource 4, the terminal device determines, based on QCL information of the CSI-RS resource 4, that a beam for receiving the CSI-RS resource 4 is also the receive beam 2. Then, the terminal device obtains, through measurement by using the receive beam 2, received powers of the CSI-RS resource 1, the CSI-RS resource 2, the CSI-RS resource 3, and the CSI-RS resource 4, namely RSRP21, RSRP22, RSRP23, and RSRP24, respectively; and uses RSRP24 as the channel corresponding to the CSI-RS resource 4, and RSRP21, RSRP22, and RSRP23 as a first interference corresponding to the CSI-RS resource 4. Optionally, a signal to interference plus noise ratio corresponding to the CSI-RS resource 4 may be further obtained through calculation as follows:

$$SINR4=RSRP24/(RSRP21+RSRP22+RSRP23)$$

Still further, as shown in FIG. 2, because the receive beams for receiving the CSI-RS resource 1 and the CSI-RS resource 2 are both the receive beam 1, in actual measurement, the terminal device performs one measurement on the CSI-RS resource 1, the CSI-RS resource 2, the CSI-RS resource 3, and the CSI-RS resource 4 by using the receive beam 1 to obtain SINR1 of the CSI-RS resource 1 and SINR2 of the CSI-RS resource 2 through calculation, not requiring two measurements. Likewise, as shown in FIG. 3, because the receive beams for receiving the CSI-RS resource 3 and the CSI-RS resource 4 are both the receive beam 2, in actual measurement, the terminal device performs one measurement on the CSI-RS resource 1, the CSI-RS resource 2, the CSI-RS resource 3, and the CSI-RS resource 4 by using the receive beam 2 to obtain SINR3 of the CSI-RS resource 3 and SINR4 of the CSI-RS resource 4 through calculation, not requiring two measurements. That is, the terminal device may obtain SINR1, SINR2, SINR3, and SINR4 through measurement by polling two times instead of polling four times, thereby reducing a measurement time of the terminal device and reducing computing resources of the terminal device.

Therefore, optionally, the method shown in FIG. 1 may further include: determining, based on the QCL information of the at least one first reference signal resource, a quantity of measurement times corresponding to the at least one first reference signal resource, so as to reduce a measurement time of the terminal device and reduce computing resources of the terminal device. Specifically, when two or more first reference signal resources with the same receive beam are determined based on the QCL information of the at least one first reference signal resource, the quantity of measurement times corresponding to the at least one first reference signal resource can be reduced. For example, in the examples shown in FIG. 2 and FIG. 3, it may be determined, based on the QCL information, that every two reference signal resources have the same receive beam, the quantity of measurement times for the terminal device may be reduced from four to two.

Optionally, in step 102, the terminal device may further adjust, based on the QCL information of the at least one first reference signal resource, a measurement order for measuring the at least one first reference signal resource. For example, during measurement on the four CSI-RS resources in the examples shown in FIG. 2 and FIG. 3, the terminal device may alternatively first measure the channels and the interferences of the CSI-RS resource 3 and the CSI-RS resource 4 by using the receive beam 2, and then measure the channels and the interferences of the CSI-RS resource 1 and the CSI-RS resource 2 by using the receive beam 1.

In the foregoing first example, the first interference representing the inter-beam interference may be specifically obtained through measurement, and therefore the network device may select an ideal beam for transmitting a signal or channel to the terminal device, thereby increasing a throughput and decreasing a block error rate.

Figure 4:
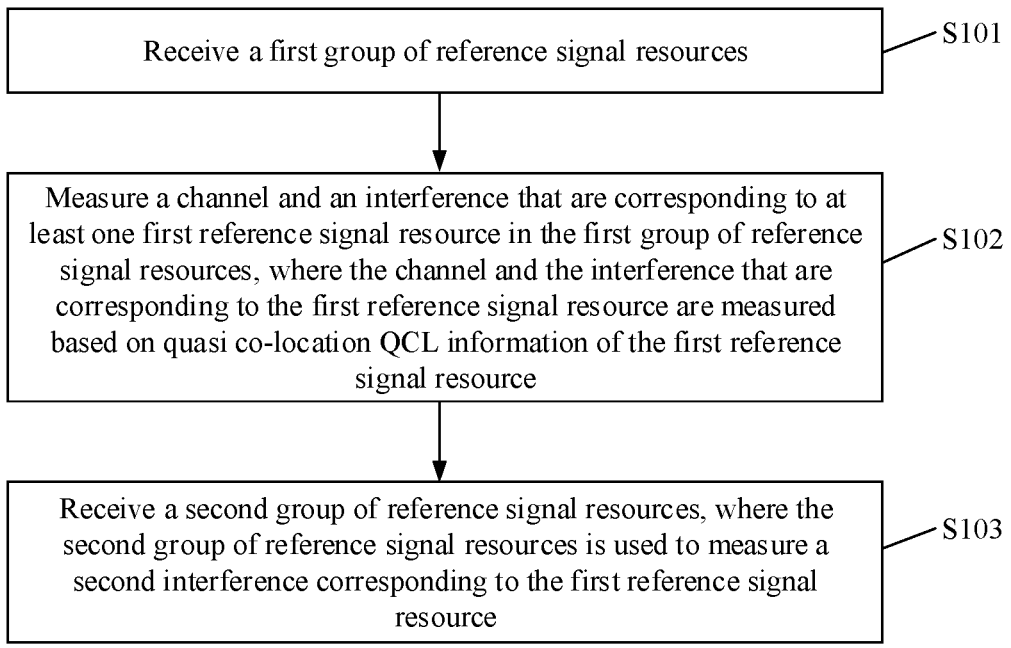
FIG. 4 is a schematic flowchart 2 of a method for channel and interference measurement according to some embodiments of this disclosure.

In the second example, as shown in FIG. 4, if the channel and the interference that are corresponding to the first reference signal resource include the second interference, and the second interference may be a parameter used for representing a neighboring-cell interference, the method for channel and interference measurement applied to the terminal device provided in some embodiments of this disclosure may further include the following step.

Step 103: Receive a second group of reference signal resources, where the second group of reference signal resources is used to measure a second interference corresponding to the first reference signal resource.

Reference signal resources in the second group of reference signal resources may include: at least one of a channel state information-interference measurement (CSI-IM) resource, an interference measurement resource (IMR), and an NZP CSI-RS (Non Zero Power Channel State Information Reference Signal) resource.

Further, at least one reference signal resource in the second group of reference signal resources partially or completely overlaps at least one reference signal resource in the first group of reference signal resources. It is easy to understand that resource overheads for the network device are reduced on the whole when the at least one reference signal resource in the second group of reference signal resources partially or completely overlaps the at least one reference signal resource in the first group of reference signal resources, in comparison to a case in the related art that a reference signal resource specially used for measuring a second interference is additionally configured for the terminal device to measure the second interference.

In a first specific implementation, one reference signal resource in the second group of reference signal resources may partially or completely overlap correspondingly one reference signal resource in the first group of reference signal resources. In a second specific implementation, one reference signal resource in the second group of reference signal resources may partially or completely overlap correspondingly a plurality of corresponding reference signal resources in the first group of reference signal resources. In a third specific implementation, a plurality of reference signal resources in the second group of reference signal resources may partially or completely overlap correspondingly one reference signal resource in the first group of reference signal resource; and so on.

For example, it is assumed that the network device has four transmit beams. Correspondingly, the first group of reference signal resources transmitted by the network device to the terminal device includes a CSI-RS resource 1, a CSI-RS resource 2, a CSI-RS resource 3, and a CSI-RS resource 4. The second group of reference signal resources transmitted by the network device to the terminal device includes a CSI-IM resource 1, a CSI-IM resource 2, a CSI-IM resource 3, and a CSI-IM resource 4.

The CSI-IM resource 1 partially or completely overlaps correspondingly the CSI-RS resource 1, the CSI-IM resource 2 partially or completely overlaps correspondingly the CSI-RS resource 2, the CSI-IM resource 3 partially or completely overlaps correspondingly the CSI-RS resource 3, and the CSI-IM resource 4 partially or completely overlaps correspondingly the CSI-RS resource 4. Alternatively, the CSI-IM resource 1 partially or completely overlaps the CSI-RS resource 1, the CSI-RS resource 2, and the CSI-RS resource 3 separately; or the CSI-IM resource 1, the CSI-IM resource 2, the CSI-IM resource 3 each partially or completely overlap the CSI-RS resource 1; and so on.

It should be noted that, similar to the foregoing first example, when one reference signal resource in the second group of reference signal resources partially or completely overlaps one reference signal resource in the first group of reference signal resources, whether the overlapping reference signal resource is used for measuring the channel or measuring the second interference depends on whether the currently measured beam is a transmit beam corresponding to the reference signal resource. If the currently measured beam is the transmit beam corresponding to the reference signal resource, the reference signal resource may be used for measuring the channel; if the currently measured beam is not the transmit beam corresponding to the reference signal resource, the reference signal resource may be used for measuring the second interference.

Further, at least one third reference signal resource has an association relationship with the first reference signal resource, where the third reference signal resource is a reference signal resource in the second group of reference signal resources, and the third reference signal resource having an association relationship with the first reference signal resource is used to measure the second interference corresponding to the first reference signal resource.

In a first specific implementation, a plurality of third reference signal resources may be associated with one first reference signal resource. In a second specific implementation, one third reference signal resource may be associated with one first reference signal resource. In a third specific implementation, one third reference signal resource may be associated with a plurality of first reference signal resources; and so on.

For example, still using the foregoing example, it is assumed that the network device has four transmit beams. Correspondingly, the first group of reference signal resources transmitted by the network device to the terminal device includes a CSI-RS resource 1, a CSI-RS resource 2, a CSI-RS resource 3, and a CSI-RS resource 4. The second group of reference signal resources transmitted by the network device to the terminal device includes a CSI-IM resource 1, a CSI-IM resource 2, a CSI-IM resource 3, and a CSI-IM resource 4.

The CSI-IM resource 1, the CSI-IM resource 2, and the CSI-IM resource 3 each are associated with the CSI-RS resource 1. Alternatively, the CSI-RS resource 1 is associated with the CSI-IM resource 1, the CSI-RS resource 2 is associated with the CSI-IM resource 2, the CSI-RS resource 3 is associated with the CSI-IM resource 3, and the CSI-RS resource 4 is associated with the CSI-IM resource 4. Alternatively, the CSI-RS resource 1 is associated with the CSI-IM resource 2, the CSI-IM resource 3, and the CSI-IM resource 4; the CSI-RS resource 2 is associated with the CSI-IM resource 1, the CSI-IM resource 3, and the CSI-IM resource 4; the CSI-RS resource 3 is associated with the CSI-IM resource 1, the CSI-IM resource 2, and the CSI-IM resource 4; and the CSI-RS resource 4 is associated with the CSI-IM resource 1, the CSI-IM resource 2, and the CSI-IM resource 3. Other association manners are used.

Optionally, in step 102, the terminal device may measure, based on the QCL information of the first reference signal resource and at least one third reference signal resource associated with the first reference signal resource, the second interference corresponding to the first reference signal resource.

Specifically, the terminal device may determine, based on the QCL information, a reception parameter used for receiving the at least one third reference signal resource associated with the first reference signal resource; receive, based on the reception parameter, the at least one third reference signal resource associated with the first reference signal resource; and determine, based on a received power of the at least one third reference signal resource associated with the first reference signal resource, the second interference corresponding to the first reference signal resource.

In this way, in the example shown in FIG. 2, if the third reference signal resource associated with the CSI-RS resource 1 is the CSI-IM resource 2, the CSI-IM resource 3, and the CSI-IM resource 4, the terminal device may measure, based on QCL information of the CSI-RS resource 1, a channel (RSRP11) corresponding to the CSI-RS resource 1; and based on the QCL information of the CSI-RS resource 1, measure the CSI-IM resource 2, the CSI-IM resource 3, and the CSI-IM resource 4 that are associated with the CSI-RS resource 1 to obtain a second interference corresponding to the CSI-RS resource 1. Correspondingly, a signal to interference plus noise ratio corresponding to the CSI-RS resource 1 may be: SINR1=RSRP11/second interference, where the second interference may be a sum or an average value of received powers of the CSI-IM resource 2, the CSI-IM resource 3, and the CSI-IM resource 4.

In the foregoing second example, the terminal device may obtain, through measurement based on the second group of reference signal resources, the second interference representing the neighboring-cell interference, and therefore the network device may select an ideal beam for transmitting a signal or channel to the terminal device, thereby increasing a throughput and decreasing a block error rate.

In the third example, if the interference includes the first interference and the second interference, the terminal device may measure, based on the QCL information and at least one second reference signal resource, the first interference corresponding to the first reference signal resource. The first reference signal resource corresponds to a target signal quality parameter, and the second reference signal resource is a reference signal resource other than the first reference signal resource in the first group of reference signal resources. The method for channel and interference measurement provided in some embodiments of may further include: receiving a second group of reference signal resources, where the second group of reference signal resources is used to measure the second interference corresponding to the first reference signal resource.

It should be understood that the third example is a combination of the first example and the second example. For related details, refer to the foregoing description. Details are not repeated herein. The following provides brief description with an example.

For example, in the example shown in FIG. 2, if the third reference signal resource associated with the CSI-RS resource 1 is the CSI-IM resource 2, the CSI-IM resource 3, and the CSI-IM resource 4, the terminal device may measure, based on QCL information of the CSI-RS resource 1, a channel (RSRP11) corresponding to the CSI-RS resource 1; based on the QCL information of the CSI-RS resource 1, measure the CSI-RS resource 2, the CSI-RS resource 3, and the CSI-RS resource 4 to obtain the first interference corresponding to the CSI-RS resource 1; and based on the QCL information of the CSI-RS resource 1, measure the CSI-IM resource 2, the CSI-IM resource 3, and the CSI-IM resource 4 that are associated with the CSI-RS resource 1 to obtain the second interference corresponding to the CSI-RS resource 1.

Correspondingly, a signal to interference plus noise ratio corresponding to the CSI-RS resource 1 may be: SINR1=RSRP11/(first interference+second interference), where the first interference may be RSRP12+RSRP13+RSRP14, and the second interference may be a sum or an average value of received powers of the CSI-IM resource 2, the CSI-IM resource 3, and the CSI-IM resource 4.

For another example, if one CSI-IM resource overlaps a plurality of CSI-RS resources, as shown in the example of FIG. 2, the CSI-IM resource 1 separately overlaps the CSI-RS resource 2, the CSI-RS resource 3, and the CSI-RS resource 4, and the CSI-IM resource 1 is associated with the CSI-RS resource 1. Then, during measurement of the first interference and the second interference that are corresponding to the CSI-RS resource 1, it is supposed that the terminal device uses, as the first interference, the sum of the received powers of the CSI-RS resource 2, the CSI-RS resource 3, and the CSI-RS resource 4 that are obtained through measurement based on the QCL parameter of the CSI-RS resource 1, and uses, as the second interference, a received power of the CSI-IM resource 1 obtained through measurement based on the QCL parameter of the CSI-RS resource 1. However, because the CSI-IM resource 1 separately overlaps the CSI-RS resource 2, the CSI-RS resource 3, and the CSI-RS resource 4, the received powers of the CSI-RS resource 2, the CSI-RS resource 3, and the CSI-RS resource 4 that are obtained through measurement based on the QCL parameter of the CSI-RS resource 1 include part or all of the received power of the CSI-IM resource 1.

Specifically, the received power of the CSI-IM resource 1 is all included when the CSI-IM resource 1 completely overlaps the CSI-RS resource 2, the CSI-RS resource 3, and the CSI-RS resource 4; and the received power of the CSI-IM resource 1 is partially included when the CSI-IM resource 1 partially overlaps the CSI-RS resource 2, the CSI-RS resource 3, and the CSI-RS resource 4. In other words, the first interference includes part or all of the second interference. When the first interference includes all of the second interference, only the first interference or the second interference needs to be measured, to obtain an inter-beam interference and a neighboring-cell interference that are corresponding to the first reference signal resource.

On this basis, optionally, if the at least one third reference signal resource associated with the first reference signal resource completely overlaps the at least one second reference signal resource, the terminal device may first determine, based on the QCL information, a reception parameter used for receiving the at least one second reference signal resource and the at least one third reference signal resource that is associated with the first reference signal resource. Then, the terminal device receives the at least one second reference signal resource based on the reception parameter, and determines, based on the received power of the at least one second reference signal resource, the first interference and the second interference that are corresponding to the first reference signal resource. Alternatively, the terminal device receives, based on the reception parameter, the at least one third reference signal resource associated with the first reference signal resource, and determines, based on the received power of the at least one third reference signal resource associated with the first reference signal resource, the first interference and the second interference that are corresponding to the first reference signal resource.

In the foregoing third example, not only the first interference representing the inter-beam interference can be obtained through measurement, but also the second interference representing the neighboring-cell interference can be obtained through measurement. Therefore, the network device may select an ideal beam for transmitting a signal or channel to the terminal device, thereby increasing a throughput and decreasing a block error rate.

On the basis of any one of the first example to the third example, after receiving the first group of reference signal resources transmitted by the network device, the terminal device may measure channels and interferences of all the reference signal resources in the first group of reference signal resources, or may measure channels and interferences of part of the reference signal resources in the first group of reference signal resources, and the terminal device may measure, in different orders, the reference signal resources that need to be measured.

Which reference signal resources to be measured by the terminal device (that is, which reference signal resources are specifically included in the at least one first reference signal resource) and in what order measurement is performed may be implemented in a specific implementation as follows: according to a preset measurement rule, measuring the channel and the interference that are corresponding to the at least one first reference signal resource in the first group of reference signal resources. The preset measurement rule is used to determine the at least one first reference signal resource that needs to be measured, and a measurement order of the at least one first reference signal resource, and the preset measurement rules corresponding to different measurement periods are the same or different.

Specifically, during a specific measurement period, the terminal device may determine the preset measurement rule in at least one of the following manners: determining the preset measurement rule based on indication information of the network device; determining the preset measurement rule based on a preset protocol; determining the preset measurement rule based on a reference signal resource meeting a preset condition in the first group of reference signal resources; and so on.

The determining the preset measurement rule based on a reference signal resource meeting a preset condition in the first group of reference signal resources may include: determining the preset measurement rule based on a reference signal resource whose channel and interference meet a first preset condition in a most recent historical measurement result of the first group of reference signal resources.

For example, assuming that the reference signal resources in the first group of reference signal resources are CSI-RS resources, several CSI-RS resources whose signal quality parameters or channels (such as RSRPs) in the most recent measurement result are greater than a preset value or less than a preset value, or several CSI-RS resources located in the front of a sorted list may be determined as the at least one first reference signal resource that needs to be measured during the current measurement period, where the sorting may be in either ascending or descending order. Specifically, for example, it is assumed that four first reference signal resources, namely the CSI-RS resource 1, the CSI-RS resource 2, the CSI-RS resource 3, and the CSI-RS resource 4, are measured in the last measurement, and the measurement result is that a SINR of the CSI-RS resource 1 and a SINR of the CSI-RS resource 2 are greater than those of the other two CSI-RS resources. Then, the preset measurement rule may be determined as: first measuring the channel and the interference that are corresponding to the CSI-RS resource 1, and then measuring the channel and the interference that are corresponding to the CSI-RS resource 2.

Optionally, during the next measurement period, the terminal device may measure, according to another preset measurement rule, the channel and the interference that are corresponding to the at least one first reference signal resource. For example, the another preset measurement rule may be: successively measuring the channels and the interferences that are corresponding to the CSI-RS resource 1, the CSI-RS resource 2, the CSI-RS resource 3, and the CSI-RS resource 4. Alternatively, the another preset measurement rule may be: successively measuring the channels and the interferences that are corresponding to the CSI-RS resource 4, the CSI-RS resource 3, the CSI-RS resource 2, and the CSI-RS resource 1. Alternatively, the another preset measurement rule may be: successively measuring the channels and the interferences that are corresponding to the CSI-RS resource 4 and the CSI-RS resource 3; and so on.

For another example, it is assumed that the network device has four transmit beams and the terminal device has two receive beams. Correspondingly, the first group of reference signal resources transmitted by the network device to the terminal device includes a CSI-RS resource 1, a CSI-RS resource 2, a CSI-RS resource 3, and a CSI-RS resource 4. The second group of reference signal resources transmitted by the network device to the terminal device includes a CSI-IM resource 1, a CSI-IM resource 2, a CSI-IM resource 3, and a CSI-IM resource 4. The CSI-RS resource 1 is associated with the CSI-IM resource 1, the CSI-RS resource 2 is associated with the CSI-IM resource 2, the CSI-RS resource 3 is associated with the CSI-IM resource 3, and the CSI-RS resource 4 is associated with the CSI-IM resource 4.

In this case, the terminal device may perform measurement according to the following preset measurement rule: successively measuring the CSI-RS resource 1, the CSI-IM resource associated with the CSI-RS resource 1, the CSI-RS resource 2, the CSI-IM resource associated with the CSI-RS resource 2, the CSI-RS resource 3, the CSI-IM resource associated with the CSI-RS resource 3, the CSI-RS resource 4, and the CSI-IM resource associated with the CSI-RS resource 4. Specifically, based on the QCL information, configured by the network device, of the CSI-RS resource 1, the terminal device determines to use the receive beam 1 to measure a channel, a first interference, and a second interference that are corresponding to the CSI-RS resource 1; uses an RSRP of the CSI-RS resource 1 as the channel corresponding to the CSI-RS resource 1, a sum of received powers of the CSI-RS resource 2, the CSI-RS resource 3, and the CSI-RS resource 4 as the first interference corresponding to the CSI-RS resource 1; and uses a measurement result of the CSI-IM resource 1 as the second interference corresponding to the CSI-RS resource 1; and so on.

It is conceivable that there may be many types of preset measurement rules, which are not limited in some embodiments of this disclosure.

Optionally, same as the foregoing first example, in the foregoing second and third examples, the terminal device may alternatively determine, based on the QCL information of the at least one first reference signal resource, a quantity of measurement times corresponding to the at least one first reference signal resource, so as to reduce a measurement time of the terminal device and reduce computing resources of the terminal device. Specifically, when two or more first reference signal resources with the same receive beam are determined based on the QCL information of the at least one first reference signal resource, the quantity of measurement times corresponding to the at least one first reference signal resource can be reduced.

Optionally, the terminal device may further adjust, based on the QCL information of the at least one first reference signal resource, a measurement order for measuring the at least one first reference signal resource.

It can be understood that a manner in which the terminal device performs measurement based on different preset measurement rules in different measurement periods is relatively flexible, and the terminal device may perform different measurement behaviors in different measurement periods. In addition, when the terminal device determines, according to the preset measurement rule, that the at least one first reference signal resource that needs to be measured is part of the reference signal resources in the first group of reference signal resources, the computing resources of the terminal device can be reduced. Correspondingly, when the network device also transmits the first group of reference signal resources according to the preset measurement rule, if the first group of reference signal resources is part of one pre-configured group of reference signal resources, resource overheads for the network device can also be reduced.

According to a method for channel and interference measurement in some embodiments of this disclosure, the QCL information of the first reference signal resource in the first group of reference signal resources can be used to measure the channel corresponding to the first reference signal resource, and the QCL information of the first reference signal resource can also be used to measure the interference corresponding to the first reference signal resource. In this way, a measurement result better reflecting signal quality of a beam corresponding to the first reference signal resource can be obtained, so that the network device selects an ideal beam for transmitting a signal or channel to UE, thereby improving a throughput and decreasing a block error rate.

In addition, the terminal device may perform different measurement behaviors in different measurement periods according to different preset measurement rules. Specifically, when the terminal device determines, according to the preset measurement rule, that the at least one first reference signal resource that needs to be measured is part of the reference signal resources in the first group of reference signal resources, the computing resources of the terminal device can be reduced. Correspondingly, when the network device also transmits the first group of reference signal resources according to the preset measurement rule, if the first group of reference signal resources is part of one pre-configured group of reference signal resources, resource overheads for the network device can also be reduced.

Furthermore, in the foregoing first example, the network device does not need to configure an additional reference signal resource used for measuring the interference, and the channel and the first interference that are corresponding to the first reference signal resource may be obtained through measurement based on the first group of reference signal resources, thereby reducing resource overheads for the network device. In addition, in the foregoing second and third examples, at least one reference signal resource in the second group of reference signal resources may overlap at least one reference signal resource in the first group of reference signal resources. Therefore, although a reference signal resource specially used for measuring the second interference is configured, this can still reduce the resource overheads for the network device on the whole in comparison to the related art.

In addition, when the terminal device determines two or more first reference signal resources with the same receive beam based on the QCL information of the at least one first reference signal resource, the quantity of measurement times corresponding to the at least one first reference signal resource can be reduced, so as to reduce a measurement time of the terminal device and reduce computing resources of the terminal device.

Optionally, on the basis of any one of the foregoing embodiments, a method for channel and interference measurement applied to the terminal device provided in some embodiments of this disclosure may further include: based on a channel and an interference that are obtained through measurement by using a target reference signal resource, determining whether to apply a measurement restriction to the target reference signal resource, where the target reference signal resource is any one of the first group of reference signal resources or any one of the second group of reference signal resources.

In other words, whether to apply the measurement restriction to the target reference signal resource is determined based on whether the target reference signal resource is used to measure the channel or the interference.

In a specific implementation, when the target reference signal resource is used to measure the channel, it may be determined to apply the measurement restriction to the target reference signal resource; and when the target reference signal resource is used to measure the interference, it may be determined not to apply the measurement restriction to the target reference signal resource.

In another specific implementation, when the target reference signal resource is used to measure the interference, it may be determined to apply the measurement restriction to the target reference signal resource; and when the target reference signal resource is used to measure the channel, it may be determined not to apply the measurement restriction to the target reference signal resource.

Alternatively, when the target reference signal resource is used to measure the channel and the interference, it may be all determined to apply the measurement restriction to the target reference signal resource.

It should be understood that whether to apply the measurement restriction to the target reference signal resource can be flexibly set, which is not limited in some embodiments of this disclosure.

The following describes the measurement restriction by using an example. If it is determined to apply the measurement restriction to the target reference signal resource when the target reference signal resource is used to measure the interference, the measurement restriction may be that: In one measurement period, only a measurement result of the target reference signal resource at one measurement time point can be used as the interference, neither using an average value of a plurality of measurement results of the target reference signal resource at different measurement time points as the interference, nor using an average value of measurement results of a plurality of target reference signal resources as the interference; and so on.

Figure 5:
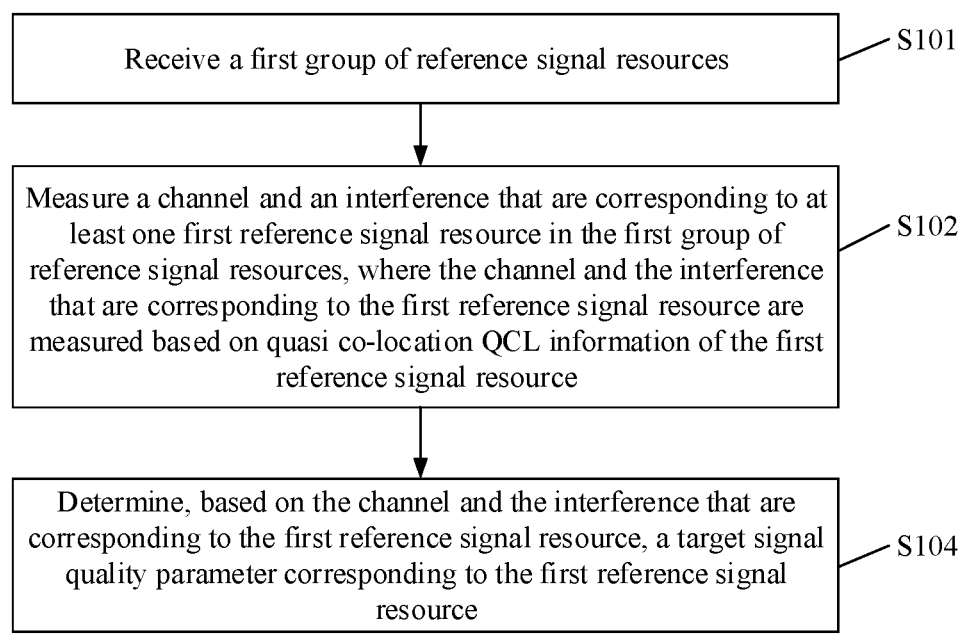
FIG. 5 is a schematic flowchart 3 of a method for channel and interference measurement according to some embodiments of this disclosure.

As shown in FIG. 5, on the basis of any one of the foregoing embodiments, a method for channel and interference measurement applied to the terminal device provided in some embodiments of this disclosure may further include the following step.

Step 104: Determine, based on the channel and the interference that are corresponding to the first reference signal resource, a target signal quality parameter corresponding to the first reference signal resource.

Specifically, in step 104, the terminal device may determine a ratio of the channel corresponding to the first reference signal resource to the interference corresponding to the first reference signal resource as the target signal quality parameter corresponding to the first reference signal resource. The interference may be at least one of the first interference and the second interference, and the target signal quality parameter is the SINR described above.

According to a method for channel and interference measurement provided in the embodiment shown in FIG. 5, the target signal quality parameter corresponding to the first reference signal resource can be further determined based on the channel and the interference. Therefore, a measurement result better reflecting signal quality of beams corresponding to a plurality of target signal quality parameters can be obtained, so that the network device selects, based on the measurement result, an ideal beam for transmitting a signal or channel to the terminal device, thereby improving a throughput and decreasing a block error rate.

Optionally, on the basis of the embodiment shown in FIG. 5, a method for channel and interference measurement provided in some embodiments of this disclosure may further include: selecting, from the at least one first reference signal resource, at least one fourth reference signal resource whose target signal quality parameter satisfies a second preset condition; and reporting at least one of an index of the at least one fourth reference signal resource, a target signal quality parameter of the at least one fourth reference signal resource, and a channel of the at least one fourth reference signal resource.

In an example, at least one fourth reference signal resource whose SINR is greater than or equal to a preset threshold may be selected from the at least one first reference signal resource; or the at least one first reference signal resource is sorted in descending order of SINRs, and at least one fourth reference signal resource located in the front of the sorted list is selected.

For example, M fourth reference signal resources are selected from N first reference signal resources in any one of the foregoing manners. Then, SINRs of the M fourth reference signal resources, indexes of the M fourth reference signal resources, and other information related to the SINRs corresponding to the M fourth reference signal resources are reported to the network device, so that the network device determines an ideal beam for transmitting a signal or channel to the terminal device.

Optionally, on the basis of any one of the foregoing embodiments, a method for channel and interference measurement provided in some embodiments of this disclosure may further include: determining a value of a repetition parameter configured by the network device; where in a case that the value is off, the channel and the interference that are corresponding to the at least one first reference signal resource in the first group of reference signal resources are measured.

Repetition is a parameter used for determining whether to perform repeated measurement on a transmit beam of the network device. If the value of repetition is on, it indicates that repeated measurement is performed on one transmit beam of the network device; if the value of repetition is off, it indicates that a plurality of beams of the network device are measured in a polling manner.

Some embodiments of this disclosure are intended to describe that: in a case that the value of repetition is off, a method for channel and interference measurement provided in some embodiments of this disclosure is used to measure the channel and the interference that are corresponding to the at least one first reference signal resource. Conversely, in a case that the value of repetition is on, a method for channel and interference measurement provided in some embodiments of this disclosure may be not used for measurement.

It should be noted that, in some embodiments of this disclosure, the first group of reference signal resources, the second group of reference signal resources, and the value of repetition may be configured by using the same configuration information.

The foregoing describes the method for channel and interference measurement applied to the terminal device. The following describes a method for channel and interference measurement applied to a network device provided in some embodiments of this disclosure with reference to FIG. 6 and FIG. 7.

Figure 6:
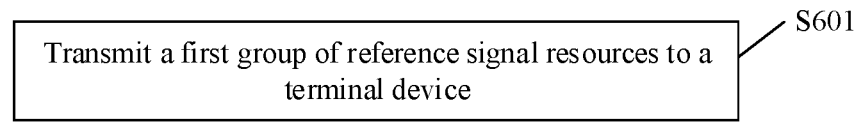
FIG. 6 is another schematic flowchart 1 of a method for channel and interference measurement according to some embodiments of this disclosure.

As shown in FIG. 6, a method for channel and interference measurement applied to a network device provided in some embodiments of this disclosure may include the following steps.

Step 601: Transmit a first group of reference signal resources to a terminal device.

The terminal device is configured to measure a channel and an interference that are corresponding to at least one first reference signal resource in the first group of reference signal resources, and measure, based on quasi co-location QCL information of the first reference signal resource, the channel and the interference that are corresponding to the first reference signal resource.

Specifically, the terminal device is configured to: determine, based on the QCL information of the first reference signal resource, a reception parameter used for receiving the first reference signal resource; receive the first reference signal resource based on the reception parameter; and determine, based on a received power of the first reference signal resource, the channel corresponding to the first reference signal resource.

In the first example, the interference includes a first interference. The terminal device is configured to measure, based on the QCL information and at least one second reference signal resource, a first interference corresponding to the first reference signal resource, the first reference signal resource corresponds to a target signal quality parameter, and the second reference signal resource is a reference signal resource other than the first reference signal resource in the first group of reference signal resources.

Specifically, the terminal device is configured to: determine, based on the QCL information, a reception parameter for receiving the at least one second reference signal resource; receive the at least one second reference signal resource based on the reception parameter; and determine, based on a received power of the at least one second reference signal resource, the first interference corresponding to the first reference signal resource.

Figure 7:
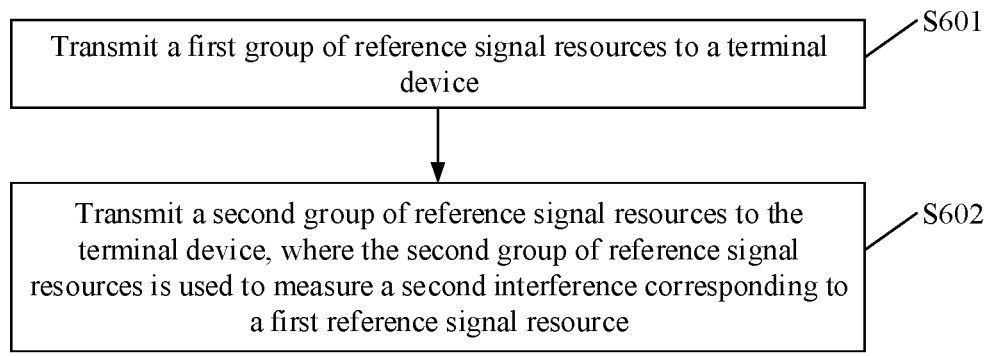
FIG. 7 is another schematic flowchart 2 of a method for channel and interference measurement according to some embodiments of this disclosure.

In the second example, as shown in FIG. 7, the interference includes a second interference, and the method further includes the following step.

Step 602: Transmit a second group of reference signal resources to the terminal device, where the second group of reference signal resources is used to measure a second interference corresponding to the first reference signal resource.

Optionally, at least one reference signal resource in the second group of reference signal resources partially or completely overlaps at least one reference signal resource in the first group of reference signal resources.

Optionally, at least one third reference signal resource has an association relationship with the first reference signal resource, where the third reference signal resource is a reference signal resource in the second group of reference signal resources, and the third reference signal resource having an association relationship with the first reference signal resource is used to measure the second interference corresponding to the first reference signal resource.

On this basis, the terminal device is configured to measure, based on the QCL information and the at least one third reference signal resource associated with the first reference signal resource, the second interference corresponding to the first reference signal resource.

Specifically, the terminal device is configured to: determine, based on the QCL information, a reception parameter used for receiving the at least one third reference signal resource associated with the first reference signal resource; determine, based on the reception parameter, the at least one third reference signal resource associated with the first reference signal resource; and determine, based on a received power of the at least one third reference signal resource associated with the first reference signal resource, the second interference corresponding to the first reference signal resource.

In the third example, the interference includes the first interference and the second interference. For measurement of the first interference, refer to the foregoing first example; for the measurement of the second interference, refer to the foregoing second example.

On the basis of any one of the first example to the third example, the terminal device is configured to: measure, according to a preset measurement rule, the channel and the interference that are corresponding to the at least one first reference signal resource in the first group of reference signal resources. The preset measurement rule is used to determine the at least one first reference signal resource and a measurement order of the at least one first reference signal resource, and the preset measurement rules corresponding to different measurement periods are the same or different.

The terminal device is configured to determine the preset measurement rule in at least one of the following manners: determining the preset measurement rule based on indication information of the network device; determining the preset measurement rule based on a preset protocol; and determining the preset measurement rule based on a reference signal resource meeting a preset condition in the first group of reference signal resources.

Optionally, the determining the preset measurement rule based on a reference signal resource meeting a preset condition in the first group of reference signal resources includes: determining the preset measurement rule based on a reference signal resource whose channel and interference meet a first preset condition in a most recent historical measurement result of the first group of reference signal resources.

Optionally, if the terminal device determines the preset measurement rule based on the indication information of the network device, the method shown in FIG. 6 or FIG. 7 may further include: transmitting, to the terminal device, indication information used for determining the preset measurement rule.

According to a method for channel and interference measurement in some embodiments of this disclosure, the QCL information of the first reference signal resource in the first group of reference signal resources can be used to measure the channel corresponding to the first reference signal resource, and the QCL information of the first reference signal resource can also be used to measure the interference corresponding to the first reference signal resource. In this way, a measurement result better reflecting signal quality of a beam corresponding to the first reference signal resource can be obtained, so that the network device selects an ideal beam for transmitting a signal or channel to UE, thereby improving a throughput and decreasing a block error rate.

In addition, the terminal device may perform different measurement behaviors in different measurement periods according to different preset measurement rules. Specifically, when the terminal device determines, according to the preset measurement rule, that the at least one first reference signal resource that needs to be measured is part of the reference signal resources in the first group of reference signal resources, the computing resources of the terminal device can be reduced. Correspondingly, when the network device also transmits the first group of reference signal resources according to the preset measurement rule, if the first group of reference signal resources is part of one pre-configured group of reference signal resources, resource overheads for the network device can also be reduced.

Furthermore, in the foregoing first example, the network device does not need to configure an additional reference signal resource used for measuring the interference, and the channel and the first interference that are corresponding to the first reference signal resource may be obtained through measurement based on the first group of reference signal resources, thereby reducing resource overheads for the network device. In addition, in the foregoing second and third examples, at least one reference signal resource in the second group of reference signal resources may overlap at least one reference signal resource in the first group of reference signal resources. Therefore, although a reference signal resource specially used for measuring the second interference is configured, this can still reduce the resource overheads for the network device on the whole in comparison to the related art.

In addition, when the terminal device determines two or more first reference signal resources with the same receive beam based on the QCL information of the at least one first reference signal resource, the quantity of measurement times corresponding to the at least one first reference signal resource can be reduced, so as to reduce a measurement time of the terminal device and reduce computing resources of the terminal device.

Optionally, on the basis of any one of the foregoing embodiments, the terminal device is further configured to: based on a channel and an interference that are obtained through measurement by using a target reference signal resource, determine whether to apply a measurement restriction to the target reference signal resource, where the target reference signal resource is any one of the first group of reference signal resources or any one of the second group of reference signal resources.

In other words, whether to apply the measurement restriction to the target reference signal resource is determined based on whether the target reference signal resource is used to measure the channel or the interference.

In a specific implementation, when the target reference signal resource is used to measure the channel, it may be determined to apply the measurement restriction to the target reference signal resource; and when the target reference signal resource is used to measure the interference, it may be determined not to apply the measurement restriction to the target reference signal resource.

In another specific implementation, when the target reference signal resource is used to measure the interference, it may be determined to apply the measurement restriction to the target reference signal resource; and when the target reference signal resource is used to measure the channel, it may be determined not to apply the measurement restriction to the target reference signal resource.

Alternatively, when the target reference signal resource is used to measure the channel and the interference, it may be all determined to apply the measurement restriction to the target reference signal resource.

It should be understood that whether to apply the measurement restriction to the target reference signal resource can be flexibly set, which is not limited in some embodiments of this disclosure.

Optionally, on the basis of any one of the foregoing embodiments, the terminal device is further configured to: determine, based on the channel and the interference that are corresponding to the first reference signal resource, a target signal quality parameter corresponding to the first reference signal resource.

Specifically, the terminal device is configured to determine a ratio of the channel corresponding to the first reference signal resource to the interference corresponding to the first reference signal resource as the target signal quality parameter corresponding to the first reference signal resource. The interference may be at least one of the first interference and the second interference, and the target signal quality parameter is the SINR described above.

According to some embodiments of this disclosure, the target signal quality parameter corresponding to the first reference signal resource can be further determined based on the channel and the interference. Therefore, a measurement result better reflecting signal quality of beams corresponding to a plurality of target signal quality parameters can be obtained, so that the network device selects, based on the measurement result, an ideal beam for transmitting a signal or channel to the terminal device, thereby improving a throughput and decreasing a block error rate.

Optionally, on the basis of any one of the foregoing embodiments, the method shown in FIG. 6 or FIG. 7 may further include: receiving at least one of an index of at least one fourth reference signal resource, a target signal quality parameter of the at least one fourth reference signal resource, and a channel of the at least one fourth reference signal resource that are reported by the terminal device.

The at least one fourth reference signal resource is a reference signal resource whose target signal quality parameter satisfies a second preset condition in the at least one first reference signal resource.

In some embodiments of this disclosure, the reference signal resource includes a synchronization signal block SSB or a channel state information reference signal resource CSI-RS. Optionally, the reference signal resource is a channel state information reference signal resource CSI-RS.

Optionally, on the basis of any one of the foregoing embodiments, the method shown in FIG. 6 or FIG. 7 may further include: configuring a value of a repetition parameter. The terminal device is configured to: in a case that the value is off, measure the channel and the interference that are corresponding to the at least one first reference signal resource in the first group of reference signal resources.

Some embodiments of this disclosure are intended to describe that: in a case that the value of repetition is off, a method for channel and interference measurement provided in some embodiments of this disclosure is used to measure the channel and the interference that are corresponding to the at least one first reference signal resource. Conversely, in a case that the value of repetition is on, a method for channel and interference measurement provided in some embodiments of this disclosure may be not used for measurement.

The foregoing describes the method for channel and interference measurement applied to the network device. This method corresponds to the foregoing method for channel and interference measurement applied to the terminal device;

therefore, the description is relatively brief. For related details, refer to the description of the foregoing method for channel and interference measurement applied to the terminal device.

The following describes the terminal device and the network device in some embodiments of this disclosure in detail with reference to FIG. 8 to FIG. 12.

Figure 8:
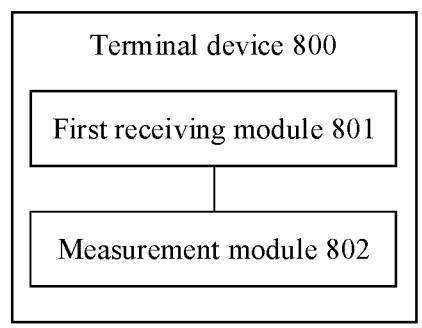
FIG. 8 is a schematic structural diagram 1 of a terminal device 800 according to some embodiments of this disclosure.

FIG. 8 is a schematic structural diagram of a terminal device according to some embodiments of this disclosure. As shown in FIG. 8, the terminal device 800 includes: a first receiving module 801 and a measurement module 802.

The first receiving module 801 is configured to receive a first group of reference signal resources.

The measurement module 802 is configured to measure a channel and an interference that are corresponding to at least one first reference signal resource in the first group of reference signal resources.

The measurement module 802 may measure, based on quasi co-location QCL information of the first reference signal resource, the channel and the interference that are corresponding to the first reference signal resource.

The measurement module 802 may specifically determine, based on the QCL information of the first reference signal resource, a reception parameter used for receiving the first reference signal resource; receive the first reference signal resource based on the reception parameter; and determine, based on a received power of the first reference signal resource, the channel corresponding to the first reference signal resource. In a more detailed example, an L1-RSRP of the first reference signal resource may be determined as the channel corresponding to the first reference signal resource.

The interference corresponding to the first reference signal resource may include at least one of a first interference and a second interference that are described below. The following describes specific processes of measuring the first interference and the second interference by using specific examples.

In the first example, if the interference includes the first interference, the measurement module 802 may measure, based on the QCL information of the first reference signal resource and at least one second reference signal resource, a first interference corresponding to the first reference signal resource. The first reference signal resource corresponds to a target signal quality parameter, and the second reference signal resource is a reference signal resource other than the first reference signal resource in the first group of reference signal resources.

Specifically, the measurement module 802 may determine, based on the QCL information, a reception parameter for receiving the at least one second reference signal resource; receive the at least one second reference signal resource based on the reception parameter; and determine, based on a received power of the at least one second reference signal resource, the first interference corresponding to the first reference signal resource.

Optionally, the terminal device 800 shown in FIG. 8 may further include: a times quantity determining module, configured to determine, based on the QCL information of the at least one first reference signal resource, a quantity of measurement times corresponding to the at least one first reference signal resource, so as to reduce a measurement time of the terminal device and reduce computing resources of the terminal device. Specifically, when two or more first reference signal resources with the same receive beam are determined based on the QCL information of the at least one first reference signal resource, the quantity of measurement times corresponding to the at least one first reference signal resource can be reduced.

Optionally, the measurement module 802 may further adjust, based on the QCL information of the at least one first reference signal resource, a measurement order for measuring the at least one first reference signal resource.

In the foregoing first example, the first interference representing an inter-beam interference may be specifically obtained through measurement, and therefore the network device may select an ideal beam for transmitting a signal or channel to the terminal device, thereby increasing a throughput and decreasing a block error rate.

Figure 9:
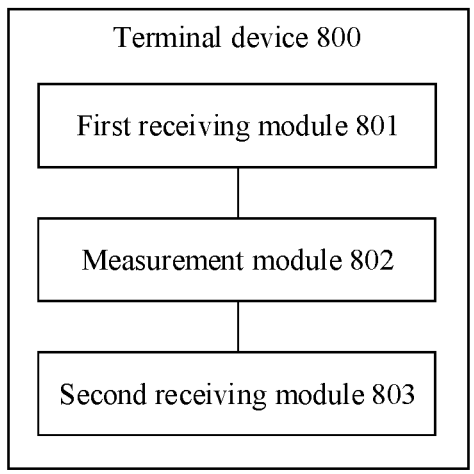
FIG. 9 is a schematic structural diagram 2 of a terminal device 800 according to some embodiments of this disclosure.

In the second example, as shown in FIG. 9, if the channel and the interference that are corresponding to the first reference signal resource include the second interference, the second interference may be a parameter representing a neighboring-cell interference. The terminal device 800 provided in some embodiments of this disclosure may further include: a second receiving module 803, configured to receive a second group of reference signal resources. The second group of reference signal resources is used to measure the second interference corresponding to the first reference signal resource.

The reference signal resources in the second group of reference signal resources may include CSI-IM resources or IMR.

Further, at least one reference signal resource in the second group of reference signal resources partially or completely overlaps at least one reference signal resource in the first group of reference signal resources. It is easy to understand that resource overheads for the network device are reduced on the whole when the at least one reference signal resource in the second group of reference signal resources partially or completely overlaps the at least one reference signal resource in the first group of reference signal resources, in comparison to a case in the related art that a reference signal resource specially used for measuring a second interference is additionally configured for the terminal device to measure the second interference.

Further, at least one third reference signal resource has an association relationship with the first reference signal resource, where the third reference signal resource is a reference signal resource in the second group of reference signal resources, and the third reference signal resource having an association relationship with the first reference signal resource is used to measure the second interference corresponding to the first reference signal resource.

Optionally, the measurement module 802 may measure, based on the QCL information of the first reference signal resource and at least one third reference signal resource associated with the first reference signal resource, the second interference corresponding to the first reference signal resource.

Specifically, the measurement module 802 may determine, based on the QCL information, a reception parameter used for receiving the at least one third reference signal resource associated with the first reference signal resource; determine, based on the reception parameter, the at least one third reference signal resource associated with the first reference signal resource; and determine, based on a received power of the at least one third reference signal resource associated with the first reference signal resource, the second interference corresponding to the first reference signal resource.

In the foregoing second example, the terminal device 800 may obtain, through measurement based on the second group of reference signal resources, the second interference representing the neighboring-cell interference, and therefore the network device may select an ideal beam for transmitting a signal or channel to the terminal device, thereby increasing a throughput and decreasing a block error rate.

In the third example, if the interference includes the first interference and the second interference, the terminal device may measure, based on the QCL information and at least one second reference signal resource, the first interference corresponding to the first reference signal resource. The first reference signal resource corresponds to a target signal quality parameter, and the second reference signal resource is a reference signal resource other than the first reference signal resource in the first group of reference signal resources. The method for channel and interference measurement provided in some embodiments of may further include: receiving a second group of reference signal resources, where the second group of reference signal resources is used to measure the second interference corresponding to the first reference signal resource.

It should be understood that the third example is a combination of the first example and the second example. For related details, refer to the foregoing description. Details are not repeated herein.

Optionally, if the at least one third reference signal resource associated with the first reference signal resource completely overlaps the at least one second reference signal resource, the terminal device may first determine, based on the QCL information, a reception parameter used for receiving the at least one second reference signal resource and the at least one third reference signal resource that is associated with the first reference signal resource. Then, the terminal device receives the at least one second reference signal resource based on the reception parameter, and determines, based on the received power of the at least one second reference signal resource, the first interference and the second interference that are corresponding to the first reference signal resource. Alternatively, the terminal device receives, based on the reception parameter, the at least one third reference signal resource associated with the first reference signal resource, and determines, based on the received power of the at least one third reference signal resource associated with the first reference signal resource, the first interference and the second interference that are corresponding to the first reference signal resource.

In the foregoing third example, not only the first interference representing the inter-beam interference can be obtained through measurement, but also the second interference representing the neighboring-cell interference can be obtained through measurement. Therefore, the network device may select an ideal beam for transmitting a signal or channel to the terminal device, thereby increasing a throughput and decreasing a block error rate.

On the basis of any one of the first example to the third example, after receiving the first group of reference signal resources transmitted by the network device, the terminal device 800 may measure channels and interferences of all the reference signal resources in the first group of reference signal resources, or may measure channels and interferences of part of the reference signal resources in the first group of reference signal resources, and the terminal device may measure, in different orders, the reference signal resources that need to be measured.

Which reference signal resources to be measured by the terminal device 800 (that is, which reference signal resources are specifically included in the at least one first reference signal resource) and in what order measurement is performed may be implemented in a specific implementation as follows: according to a preset measurement rule, measuring the channel and the interference that are corresponding to the at least one first reference signal resource in the first group of reference signal resources. The preset measurement rule is used to determine the at least one first reference signal resource that needs to be measured, and a measurement order of the at least one first reference signal resource, and the preset measurement rules corresponding to different measurement periods are the same or different.

Specifically, during a specific measurement period, the terminal device 800 may determine the preset measurement rule in at least one of the following manners: determining the preset measurement rule based on indication information of the network device; determining the preset measurement rule based on a preset protocol; determining the preset measurement rule based on a reference signal resource meeting a preset condition in the first group of reference signal resources; and so on.

The determining the preset measurement rule based on a reference signal resource meeting a preset condition in the first group of reference signal resources may include: determining the preset measurement rule based on a reference signal resource whose channel and interference meet a first preset condition in a most recent historical measurement result of the first group of reference signal resources.

It is conceivable that there may be many types of preset measurement rules, which are not limited in some embodiments of this disclosure.

Optionally, same as the foregoing first example, in the foregoing second and third examples, the terminal device 800 may alternatively determine, based on the QCL information of the at least one first reference signal resource, a quantity of measurement times corresponding to the at least one first reference signal resource, so as to reduce a measurement time of the terminal device and reduce computing resources of the terminal device. Specifically, when two or more first reference signal resources with the same receive beam are determined based on the QCL information of the at least one first reference signal resource, the quantity of measurement times corresponding to the at least one first reference signal resource can be reduced.

Optionally, the terminal device 800 may further adjust, based on the QCL information of the at least one first reference signal resource, a measurement order for measuring the at least one first reference signal resource.

It can be understood that a manner in which the terminal device performs measurement based on different preset measurement rules in different measurement periods is relatively flexible, and the terminal device may perform different measurement behaviors in different measurement periods. In addition, when the terminal device determines, according to the preset measurement rule, that the at least one first reference signal resource that needs to be measured is part of the reference signal resources in the first group of reference signal resources, the computing resources of the terminal device can be reduced. Correspondingly, when the network device also transmits the first group of reference signal resources according to the preset measurement rule, if the first group of reference signal resources is part of one pre-configured group of reference signal resources, resource overheads for the network device can also be reduced.

The terminal device 800 provided in some embodiments of this disclosure can use the QCL information of the first reference signal resource in the first group of reference signal resources to measure the channel corresponding to the first reference signal resource, and can also use the QCL information of the first reference signal resource to measure the interference corresponding to the first reference signal resource. In this way, a measurement result better reflecting signal quality of a beam corresponding to the first reference signal resource can be obtained, so that the network device selects an ideal beam for transmitting a signal or channel to UE, thereby improving a throughput and decreasing a block error rate.

Optionally, on the basis of any one of the foregoing embodiments, the terminal device provided in some embodiments of this disclosure may further include: a measurement restriction determining module, configured to: based on a channel and an interference that are obtained through measurement by using a target reference signal resource, determine whether to apply a measurement restriction to the target reference signal resource, where the target reference signal resource is any one of the first group of reference signal resources or any one of the second group of reference signal resources.

In other words, whether to apply the measurement restriction to the target reference signal resource is determined based on whether the target reference signal resource is used to measure the channel or the interference.

In a specific implementation, when the target reference signal resource is used to measure the channel, it may be determined to apply the measurement restriction to the target reference signal resource; and when the target reference signal resource is used to measure the interference, it may be determined not to apply the measurement restriction to the target reference signal resource.

In another specific implementation, when the target reference signal resource is used to measure the interference, it may be determined to apply the measurement restriction to the target reference signal resource; and when the target reference signal resource is used to measure the channel, it may be determined not to apply the measurement restriction to the target reference signal resource.

Alternatively, when the target reference signal resource is used to measure the channel and the interference, it may be all determined to apply the measurement restriction to the target reference signal resource.

It should be understood that whether to apply the measurement restriction to the target reference signal resource can be flexibly set, which is not limited in some embodiments of this disclosure.

Figure 10:
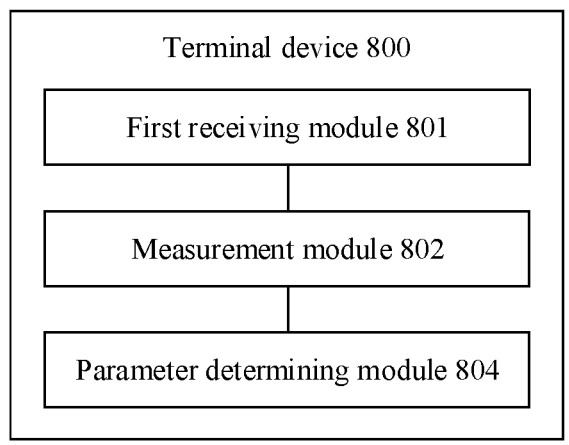
FIG. 10 is a schematic structural diagram 3 of a terminal device 800 according to some embodiments of this disclosure.

As shown in FIG. 10, on the basis of any one of the foregoing embodiments, the terminal device 800 provided in some embodiments of this disclosure may further include: a signal quality parameter determining module, configured to determine, based on the channel and the interference that are corresponding to the first reference signal resource, a target signal quality parameter corresponding to the first reference signal resource.

Specifically, the signal quality parameter determining module may determine a ratio of the channel corresponding to the first reference signal resource to the interference corresponding to the first reference signal resource as the target signal quality parameter corresponding to the first reference signal resource. The interference may be at least one of the first interference and the second interference, and the target signal quality parameter is the SINR described above.

The terminal device 800 provided in the embodiment shown in FIG. 10 can further determine, based on the channel and the interference, the target signal quality parameter corresponding to the first reference signal resource. Therefore, a measurement result better reflecting signal quality of beams corresponding to a plurality of target signal quality parameters can be obtained, so that the network device selects, based on the measurement result, an ideal beam for transmitting a signal or channel to the terminal device, thereby improving a throughput and decreasing a block error rate.

Optionally, on the basis of the embodiment shown in FIG. 10, the terminal device 800 provided in some embodiments of this disclosure may further include: a selecting module and a reporting module.

The selecting module is configured to select, from the at least one first reference signal resource, at least one fourth reference signal resource whose target signal quality parameter satisfies a second preset condition.

In an example, at least one fourth reference signal resource whose SINR is greater than or equal to a preset threshold may be selected from the at least one first reference signal resource; or the at least one first reference signal resource is sorted in descending order of SINRs, and at least one fourth reference signal resource located in the front of the sorted list is selected.

The reporting module is configured to report at least one of an index of the at least one fourth reference signal resource, a target signal quality parameter of the at least one fourth reference signal resource, and a channel of the at least one fourth reference signal resource.

On the basis of any one of the foregoing embodiments, the terminal device 800 provided in some embodiments of this disclosure may further include: a value determining module, configured to determine a value of a repetition parameter configured by the network device. In a case that the value is off, the channel and the interference that are corresponding to the at least one first reference signal resource in the first group of reference signal resources are measured.

The terminal devices shown in FIG. 8 to FIG. 10 may be used to implement various embodiments of the method for channel and interference measurements shown in FIG. 1, FIG. 4, and FIG. 5. For related details, refer to the foregoing method embodiments.

The following describes a network device 1100 provided in some embodiments of this disclosure.

Figure 11:
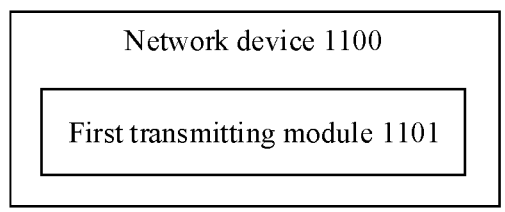
FIG. 11 is a schematic structural diagram 1 of a network device 1100 according to some embodiments of this disclosure.

As shown in FIG. 11, the network device 1100 may include: a first transmitting module 1101, configured to transmit a first group of reference signal resources to a terminal device.

The terminal device is configured to measure a channel and an interference that are corresponding to at least one first reference signal resource in the first group of reference signal resources, and the terminal device measures, based on quasi co-location QCL information of the first reference signal resource, the channel and the interference that are corresponding to the first reference signal resource.

Specifically, the terminal device is configured to: determine, based on the QCL information of the first reference signal resource, a reception parameter used for receiving the first reference signal resource; receive the first reference signal resource based on the reception parameter; and determine, based on a received power of the first reference signal resource, the channel corresponding to the first reference signal resource.

In the first example, the interference includes a first interference. The terminal device is configured to measure, based on the QCL information and at least one second reference signal resource, a first interference corresponding to the first reference signal resource, the first reference signal resource corresponds to a target signal quality parameter, and the second reference signal resource is a reference signal resource other than the first reference signal resource in the first group of reference signal resources.

Specifically, the terminal device is configured to: determine, based on the QCL information, a reception parameter for receiving the at least one second reference signal resource; receive the at least one second reference signal resource based on the reception parameter; and determine, based on a received power of the at least one second reference signal resource, the first interference corresponding to the first reference signal resource.

Figure 12:
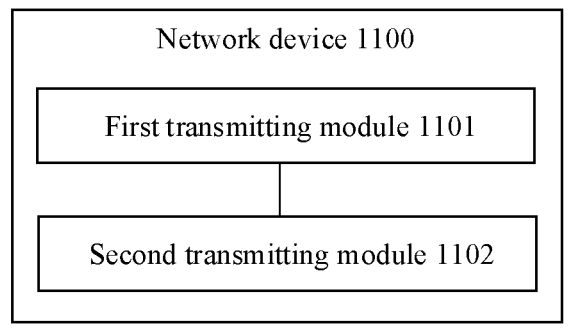
FIG. 12 is a schematic structural diagram 2 of a network device 1100 according to some embodiments of this disclosure.

In the second example, as shown in FIG. 12, the interference includes a second interference, and the network device 1100 further includes: a second transmitting module 1102, configured to transmit a second group of reference signal resources to the terminal device. The second group of reference signal resources is used to measure the second interference corresponding to the first reference signal resource.

Optionally, at least one reference signal resource in the second group of reference signal resources partially or completely overlaps at least one reference signal resource in the first group of reference signal resources.

Optionally, at least one third reference signal resource has an association relationship with the first reference signal resource, where the third reference signal resource is a reference signal resource in the second group of reference signal resources, and the third reference signal resource having an association relationship with the first reference signal resource is used to measure the second interference corresponding to the first reference signal resource.

On this basis, the terminal device is configured to measure, based on the QCL information and the at least one third reference signal resource associated with the first reference signal resource, the second interference corresponding to the first reference signal resource.

Specifically, the terminal device is configured to: determine, based on the QCL information, a reception parameter used for receiving the at least one third reference signal resource associated with the first reference signal resource; determine, based on the reception parameter, the at least one third reference signal resource associated with the first reference signal resource; and determine, based on a received power of the at least one third reference signal resource associated with the first reference signal resource, the second interference corresponding to the first reference signal resource.

In the third example, the interference includes the first interference and the second interference. For measurement of the first interference, refer to the foregoing first example; for the measurement of the second interference, refer to the foregoing second example.

On the basis of any one of the first example to the third example, the terminal device is configured to: measure, according to a preset measurement rule, the channel and the interference that are corresponding to the at least one first reference signal resource in the first group of reference signal resources. The preset measurement rule is used to determine the at least one first reference signal resource and a measurement order of the at least one first reference signal resource, and the preset measurement rules corresponding to different measurement periods are the same or different.

The terminal device is configured to determine the preset measurement rule in at least one of the following manners: determining the preset measurement rule based on indication information of the network device; determining the preset measurement rule based on a preset protocol; and determining the preset measurement rule based on a reference signal resource meeting a preset condition in the first group of reference signal resources.

Optionally, the determining the preset measurement rule based on a reference signal resource meeting a preset condition in the first group of reference signal resources includes: determining the preset measurement rule based on a reference signal resource whose channel and interference meet a first preset condition in a most recent historical measurement result of the first group of reference signal resources.

Optionally, if the terminal device determines the preset measurement rule based on the indication information of the network device, the network device 1100 shown in FIG. 11 or FIG. 12 may further include: a third transmitting module, configured to transmit, to the terminal device, indication information used for determining the preset measurement rule.

According to the network device 1100 provided in some embodiments of this disclosure, the QCL information of the first reference signal resource in the first group of reference signal resources can be used to measure the channel corresponding to the first reference signal resource, and the QCL information of the first reference signal resource can also be used to measure the interference corresponding to the first reference signal resource. In this way, a measurement result better reflecting signal quality of a beam corresponding to the first reference signal resource can be obtained, so that the network device selects an ideal beam for transmitting a signal or channel to UE, thereby improving a throughput and decreasing a block error rate.

Optionally, on the basis of any one of the foregoing embodiments, the terminal device is further configured to: based on a channel and an interference that are obtained through measurement by using a target reference signal resource, determine whether to apply a measurement restriction to the target reference signal resource, where the target reference signal resource is any one of the first group of reference signal resources or any one of the second group of reference signal resources.

In other words, whether to apply the measurement restriction to the target reference signal resource is determined based on whether the target reference signal resource is used to measure the channel or the interference.

In a specific implementation, when the target reference signal resource is used to measure the channel, it may be determined to apply the measurement restriction to the target reference signal resource; and when the target reference signal resource is used to measure the interference, it may be determined not to apply the measurement restriction to the target reference signal resource.

In another specific implementation, when the target reference signal resource is used to measure the interference, it may be determined to apply the measurement restriction to the target reference signal resource; and when the target reference signal resource is used to measure the channel, it may be determined not to apply the measurement restriction to the target reference signal resource.

Alternatively, when the target reference signal resource is used to measure the channel and the interference, it may be all determined to apply the measurement restriction to the target reference signal resource.

It should be understood that whether to apply the measurement restriction to the target reference signal resource can be flexibly set, which is not limited in some embodiments of this disclosure.

Optionally, on the basis of any one of the foregoing embodiments, the terminal device is further configured to: determine, based on the channel and the interference that are corresponding to the first reference signal resource, a target signal quality parameter corresponding to the first reference signal resource.

Specifically, the terminal device is configured to determine a ratio of the channel corresponding to the first reference signal resource to the interference corresponding to the first reference signal resource as the target signal quality parameter corresponding to the first reference signal resource. The interference may be at least one of the first interference and the second interference, and the target signal quality parameter is the SINR described above.

According to some embodiments of this disclosure, the target signal quality parameter corresponding to the first reference signal resource can be further determined based on the channel and the interference. Therefore, a measurement result better reflecting signal quality of beams corresponding to a plurality of target signal quality parameters can be obtained, so that the network device selects, based on the measurement result, an ideal beam for transmitting a signal or channel to the terminal device, thereby improving a throughput and decreasing a block error rate.

Optionally, on the basis of any one of the foregoing embodiments, the network device 1100 shown in FIG. 11 or FIG. 12 may further include: a receiving module, configured to receive at least one of an index of at least one fourth reference signal resource, a target signal quality parameter of the at least one fourth reference signal resource, and a channel of the at least one fourth reference signal resource that are reported by the terminal device.

The at least one fourth reference signal resource is a reference signal resource whose target signal quality parameter satisfies a second preset condition in the at least one first reference signal resource.

In some embodiments of this disclosure, the reference signal resource includes a synchronization signal block SSB or a channel state information reference signal resource CSI-RS. Optionally, the reference signal resource is a channel state information reference signal resource CSI-RS.

Optionally, on the basis of any one of the foregoing embodiments, the network device 1100 shown in FIG. 11 or FIG. 12 may further include: a configuration module, configured to configure a value of a repetition parameter for the network device. The terminal device is configured to: in a case that the value is off, measure the channel and the interference that are corresponding to the at least one first reference signal resource in the first group of reference signal resources.

Some embodiments of this disclosure are intended to describe that: in a case that the value of repetition is off, a method for channel and interference measurement provided in some embodiments of this disclosure is used to measure the channel and the interference that are corresponding to the at least one first reference signal resource. Conversely, in a case that the value of repetition is on, a method for channel and interference measurement provided in some embodiments of this disclosure may be not used for measurement.

The network devices shown in FIG. 11 and FIG. 12 may be used to implement various embodiments of the method for channel and interference measurements shown in FIG. 6 and FIG. 7. For related details, refer to the foregoing method embodiments.

Figure 13:
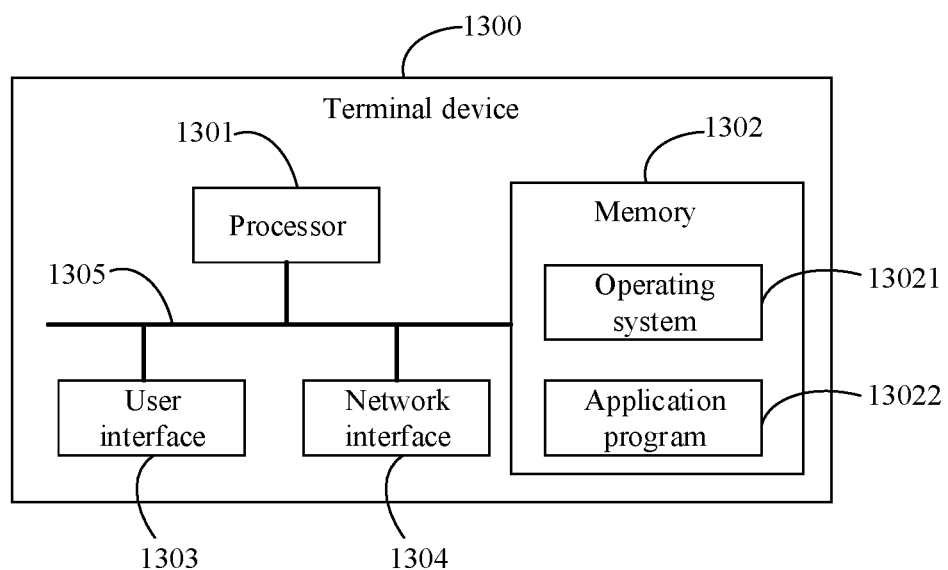
FIG. 13 is a schematic structural diagram of a terminal device 1300 according to some embodiments of this disclosure.

FIG. 13 is a schematic structural diagram of a terminal device according to another embodiment of this disclosure. The terminal device 1300 shown in FIG. 13 includes at least one processor 1301, a memory 1302, at least one network interface 1304, and a user interface 1303. The components of the terminal device 1300 are coupled together by using a bus system 1305. It may be understood that the bus system 1305 is configured to implement connection communication between these components.

The bus system 1305 may include not only a data bus but also a power supply bus, a control bus, and a status signal bus. However, for clear description, various buses in FIG. 13 are marked as the bus system 1305.

The user interface 1303 may include a display, a keyboard, a click device (for example, a mouse or a trackball), a touch board, or a touchscreen.

It can be understood that the memory 1302 in some embodiments of this disclosure may be a volatile memory or a non-volatile memory, or may include both a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), which is used as an external cache. As illustrative rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synch Link DRAM, SLDRAM), and a direct Rambus random access memory (Direct Rambus RAM, DRRAM). The memory 1302 in the system and method described in some embodiments of this disclosure is intended to include but is not limited to these and any other appropriate types of memories.

In some implementations, the memory 1302 stores the following elements: an executable module or a data structure, or a subset thereof, or an extended set thereof: an operating system 13021 and an application program 13022.

The operating system 13021 includes various system programs, such as a framework layer, a kernel library layer, and a driver layer, and is configured to implement various basic services and process hardware-based tasks. The application program 13022 includes various application programs, such as a media player, and a browser, and is configured to implement various application services. A program that implements the methods of some embodiments of this disclosure may be included in the application program 13022.

In some embodiments of this disclosure, the terminal device 1300 further includes: a computer program stored in the memory 1302 and capable of running on the processor 1301. When the computer program is executed by the processor 1301, the processes of the foregoing method for channel and interference measurement are implemented, with the same technical effects achieved. To avoid repetition, details are not described herein again.

The foregoing methods disclosed by some embodiments of this disclosure may be applied to the processor 1301, or be implemented by the processor 1301. The processor 1301 may be an integrated circuit chip with a signal processing capability. In an implementation process, steps in the foregoing method may be implemented by using a hardware integrated logic circuit in the processor 1301, or by using instructions in a form of software. The processor 1301 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in some embodiments of this disclosure. The general-purpose processor may be a microprocessor, or the processor may also be any conventional processor or the like. Steps of the methods disclosed with reference to some embodiments of this disclosure may be directly performed and completed by using a hardware decoding processor, or may be performed and completed by using a combination of hardware and a software module in a decoding processor. The software module may be located in a computer readable storage medium that is mature in the art, such as a random access memory, a flash memory, a read-only memory, a programmable read-only memory, or an electrically erasable programmable memory, or a register. The computer readable storage medium is located in the memory 1302, and the processor 1301 reads information in the memory 1302 and implements, in combination with its hardware, the steps of the foregoing methods. Specifically, a computer program is stored in the computer-readable medium, and when the computer program is executed by the processor 1301, the steps of the foregoing method for channel and interference measurement embodiments are implemented.

Figure 14:
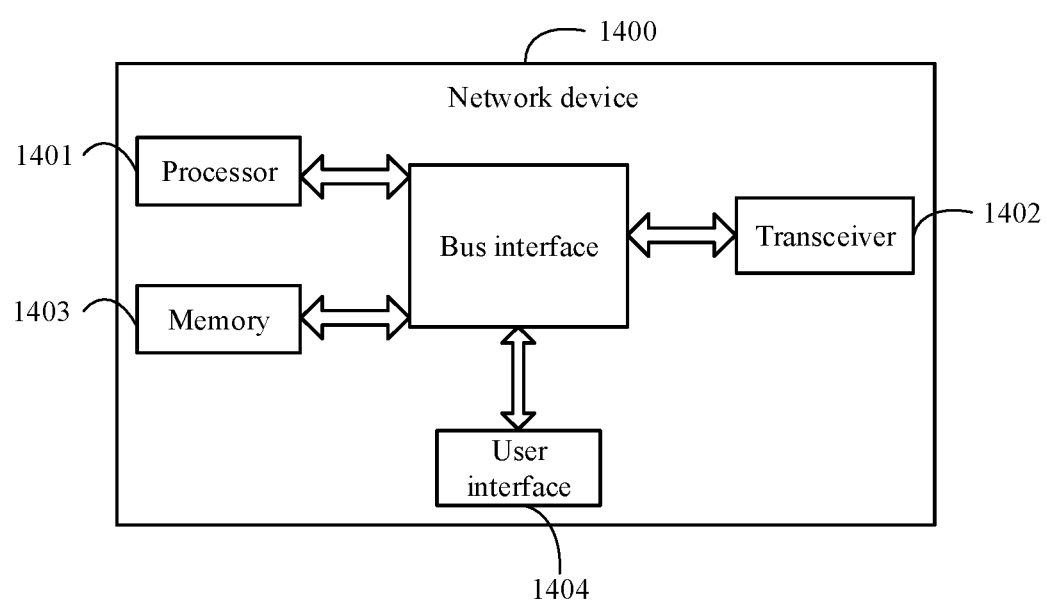
FIG. 14 is a schematic structural diagram of a network device 1400 according to some embodiments of this disclosure.

Referring to FIG. 14, FIG. 14 is a structural diagram of a network device applied to some embodiments of this disclosure. The network device is capable of implementing details of the foregoing method for channel and interference measurement, with the same effects achieved. As shown in FIG. 14, the network device 1400 includes a processor 1401, a transceiver 1402, a memory 1403, a user interface 1404, and a bus interface.

In some embodiments of this disclosure, the network device 1400 further includes: a computer program stored in the memory 1403 and capable of running on the processor 1401. When the computer program is executed by the processor 1401, the processes of the foregoing method for channel and interference measurement are implemented, with the same technical effects achieved. To avoid repetition, details are not described herein again.

In FIG. 14, a bus architecture may include any quantity of interconnected buses and bridges, and specifically connects together circuits that are of at least one processor represented by the processor 1401 and of a memory represented by the memory 1403. The bus architecture may further interconnect various other circuits such as a peripheral device, a voltage regulator, and a power management circuit. These are all well known in the art, and therefore are not further described in this specification. The bus interface provides an interface. The transceiver 1402 may be a plurality of components, that is, the transceiver 1402 includes a transmitter and a receiver, and provides a unit for communicating with various other apparatuses on a transmission medium. For different terminal devices, the user interface 1404 may also be an interface that can be externally or internally connected to a required device. The connected device includes but is not limited to a keypad, a display, a speaker, a microphone, a joystick, and the like.

The processor 1401 is responsible for management of the bus architecture and general processing, and the memory 1403 is capable of storing data that is used by the processor 1401 during operation.

It can be understood that the embodiments described some embodiments in this disclosure may be implemented by hardware, software, firmware, middleware, microcode, or a combination thereof. For hardware implementation, the processor may be implemented in at least one application specific integrated circuit (ASIC), digital signal processor (DSP), digital signal processing device (DSP Device, DSPD), programmable logic device (PLD), field-programmable gate array (FPGA), general-purpose processor, controller, microcontroller, or microprocessor; or other electronic units for performing the functions described in this disclosure or a combination thereof.

For software implementation, the techniques described in some embodiments of this disclosure may be implemented by modules (such as processes and functions) that perform the functions described in some embodiments of this disclosure. Software code may be stored in the memory and executed by the processor. The memory may be implemented in or outside the processor.

Some embodiments of this disclosure further provide a computer-readable medium, where a computer program is stored in the computer readable storage medium. When the computer program is executed by a processor, the processes of the foregoing embodiment of the method for channel and interference measurement can be implemented, with the same technical effects achieved. To avoid repetition, details are not described herein again. The computer-readable medium is, for example, a read-only memory (ROM for short), a random access memory (RAM for short), a magnetic disk, or an optical disc.

Some embodiments of this disclosure further provide a computer program product including instructions. When the computer runs the instructions of the computer program product, the computer executes the foregoing method for channel and interference measurement. Specifically, the computer program product can be run on the foregoing network device.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The storage medium may include: a magnetic disk, an optical disc, a read-only memory (ROM), or a random access memory (RAM).

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for channel and interference measurement, applied to a terminal device and comprising:
receiving a first group of reference signal resources, wherein the first group of reference signal resources is used to measure a channel corresponding to a first reference signal resource in the first group of reference signal resources and a first interference corresponding to the first reference signal resource, the first interference represents an inter-beam interference;
receiving a second group of reference signal resources having an association relationship with the first group of reference signal resources, wherein the second group of reference signal resources is used to measure a second interference corresponding to the first reference signal resource, the second interference represents a neighboring-cell interference and measuring, at least one reference signal resource in the second group of reference signal resources partially or completely overlaps with at least one reference signal resources in the first group of reference signal resources;
measuring, based on quasi co-location (QCL) information of the first reference signal resource by using the first group of reference signal resources, the channel corresponding to the first reference signal resource and the first interference corresponding to the first reference signal resources; and
measuring, based on the QCL information of the first reference signal resource by using the second group of reference signal resources, the second interference corresponding to the first reference signal resource.

2. The method according to claim 1, wherein the first reference signal resource corresponds to a target signal quality parameter.

3. The method according to claim 1, wherein the measuring the channel corresponding to the first reference signal resource comprises:
determining, based on the QCL information of the first reference signal resource, a reception parameter;
receiving the first reference signal resource based on the reception parameter; and
determining, based on a received power of the first reference signal resource, the channel corresponding to the first reference signal resource.

4. The method according to claim 3, wherein the measuring the first interference corresponding to the first reference signal resource comprises:
receiving, based on the determined reception parameter, a second reference signal resource of the first group of reference signal resource; and
determining, based on a received power of the second reference signal resource, the first interference corresponding to the first reference signal resource.

5. The method according to claim 1, further comprising:
based on a channel and an interference that are obtained through measurement by using a target reference signal resource, determining whether to apply a measurement restriction to the target reference signal resource, wherein the target reference signal resource is any one of the first group of reference signal resources or any one of the second group of reference signal resources.

6. The method according to claim 1, further comprising:
based on the channel and the interference that are obtained through measurement by using a target reference signal resource, determining whether to apply a measurement restriction to the target reference signal resource, wherein the target reference signal resource is any one of the first group of reference signal resources.

7. The method according to claim 1, wherein a second reference signal resource of the first group of reference signal resources completely overlaps with a third reference signal resource of the second group of reference signal resources, and the third reference signal resource is associated with the first reference signal resources; and
wherein the measuring the first interference corresponding to the first reference signal resource and the measuring the second interference corresponding to the first reference signal resources comprises:
determining, based on the QCL information of the first reference signal resource, a reception parameter;
performing one of:
receiving, based on the reception parameter, the third reference signal resource to determine a first received power; or
receiving, based on the reception parameter, the second reference signal resource to determine a first received power; and
determining, based on the first received power, the first interference and the second inference.

8. The method according to claim 1, further comprising:
determining the overlapping reference signal resource as a reference signal resource for measuring the channel corresponding to the first reference signal resource, in a case that a currently measured beam is a transmit beam corresponding to the overlapping reference signal resource; and
determining the overlapping reference signal resource as a reference signal resource for measuring the second interference corresponding to the first reference signal resource, in a case that the currently measured beam is not the transmit beam corresponding to the overlapping reference signal resource.

9. The method according to claim 3, wherein the measuring the second interference corresponding to the first reference signal resource comprises:
receiving, based on the determined reception parameter, a third reference signal resource of the second group of reference signal resources, wherein the third reference signal resource is associated with the first reference signal resource; and
determining, based on a received power of the third reference signal resource, the second interference corresponding to the first reference signal resource.

10. The method according to claim 4, wherein the second reference signal resource is a reference signal resource other than the first reference signal resource in the first group of reference signal resources, and a transmit beam corresponding to the second reference signal resource is different from a transmit beam corresponding to the first reference signal resource.

11. A terminal device, comprising a memory, a processor, and a wireless communications program stored in the memory and running on the processor, wherein when the wireless communications program is executed by the processor, the following steps are implemented:
receive a first group of reference signal resources, wherein the first group of reference signal resources is used to measure a channel corresponding to a first reference signal resource in the first group of reference signal resources and a first interference corresponding to the first reference signal resource, the first interference represents an inter-beam interference;

receive a second group of reference signal resources having an association relationship with the first group of reference signal resources, wherein the second group of reference signal resources is used to measure a second interference corresponding to the first reference signal resource, the second interference represents a neighboring-cell interference and measuring, at least one reference signal resource in the second group of reference signal resources partially or completely overlaps with at least one reference signal resources in the first group of reference signal resources;

measure, based on quasi co-location (QCL) information of the first reference signal resource by using the first group of reference signal resources, the channel corresponding to the first reference signal resource and the first interference corresponding to the first reference signal resources; and measure, based on the QCL information of the first reference signal resource by using the second group of reference signal resources, the second interference corresponding to the first reference signal resource.

12. The terminal device according to claim 11, wherein the measuring the channel corresponding to the first reference signal resource comprises:

determining, based on the QCL information of the first reference signal resource, a reception parameter;

receiving, based on the reception parameter, the first reference signal resource; and determining, based on a received power of the third reference signal resource associated with the first reference signal resource, the second interference corresponding to the first reference signal resource.

13. The terminal device according to claim 12, wherein the measuring the first interference corresponding to the first reference signal resource comprises:

receiving, based on the determined reception parameter, a second reference signal resource of the first group of reference signal resources; and determining, based on a received power of the second reference signal resource, the first interference corresponding to the first reference signal resource.

14. The terminal device according to claim 11, wherein when the wireless communications program is executed by the processor, the following step is further implemented:

based on a channel and an interference that are obtained through measurement by using a target reference signal resource, determining whether to apply a measurement restriction to the target reference signal resource, wherein the target reference signal resource is any one of the first group of reference signal resources or any one of the second group of reference signal resources.

15. The terminal device according to claim 11, wherein when the wireless communications program is executed by the processor, the following step is further implemented:

based on the channel and the interference that are obtained through measurement by using a target reference signal resource, determining whether to apply a measurement restriction to the target reference signal resource, wherein the target reference signal resource is any one of the first group of reference signal resources.

16. The terminal device according to claim 11, wherein when the wireless communications program is executed by the processor, the following step is further implemented:

determining the overlapping reference signal resource as a reference signal resource for measuring the channel corresponding to the first reference signal resource, in a case that a currently measured beam is a transmit beam corresponding to the overlapping reference signal resource; and determining the overlapping reference signal resource as a reference signal resource for signal resource for measuring the second interference corresponding to the first reference signal resource, in a case that the currently measured beam is not the transmit beam corresponding to the overlapping reference signal resources.

17. The terminal device according to claim 11, wherein a second reference signal resource of the first group of reference signal resources completely overlaps with a third reference signal resource of the second group of reference signal resources, and the third reference signal resource is associated with the first reference signal resource; and wherein the measuring the first interference corresponding to the first reference signal resource and the measuring the second interference ponding to the first reference signal resource comprises:

determining based on the QCL information of the first reference signal resource, a reception parameter;

performing one of:

receiving, based on the reception parameter, the third reference signal resource to determine a first received power; or receiving, based on the reception parameter, the second reference signal resource to determine a first received power; and determining, based on the first received power, the first interference and the second interference.

18. The terminal device according to claim 12, wherein the measuring the second interference corresponding to the first reference signal resource comprises:

receiving, based on the determined reception parameter, a third reference signal resource of the second group of reference signal resources, wherein the third reference signal resource is associated with the first reference signal resource; and determining, based on a received power of the third reference signal resource, the second interference corresponding to the first reference signal resource.

19. The terminal device according to claim 13, wherein the second reference signal resource is a reference signal resource other than the first reference signal resource in the first group of reference signal resources, and a transmit beam corresponding to the second reference signal resource is different from a transmit beam corresponding to the first reference signal resource.

20. A network device, comprising a memory, a processor, and a wireless communications program stored in the memory and running on the processor, wherein when the wireless communications program is executed by the processor, the following steps are implemented:

transmit, to a terminal device, a first group of reference signal resources comprising a first reference signal resource and a second group of reference signal resources having an association relationship with the first group of reference signal resources, the first group of reference signal resources being used to measure a channel corresponding to a first reference signal resource in the first group of reference signal resources and a first interference corresponding to the first reference signal resource, the second group of reference signal resources being used to measure a second interference corresponding to the first reference signal resource, the first interference represents an inter-beam interference and the second interference represents a neighboring-cell interference, at least one reference signal resource in the second group of reference signal resources partially or completely overlaps with at least one reference signal resources in the first group of reference signal resources;

measure, based on quasi co-location (QCL) information of the first reference signal resource by using the first group of reference signal resources, the channel corresponding to the first reference signal resource and the first interference corresponding to the first reference signal resources; and measure, based on the QCL information of the first reference signal resource by using the second group of reference signal resources, the second interference corresponding to the first reference signal resource.

* * * * *